United States Patent
Campbell

(10) Patent No.: US 11,010,643 B1
(45) Date of Patent: May 18, 2021

(54) SYSTEM AND METHOD TO INCREASE CONFIDENCE OF ROADWAY OBJECT RECOGNITION THROUGH GAMIFIED DISTRIBUTED HUMAN FEEDBACK

(71) Applicant: Waylens, Inc., Cambridge, MA (US)

(72) Inventor: Jeffery R. Campbell, Warkworth (CA)

(73) Assignee: WAYLENS, INC, Cambridge, MA (US)

( * ) Notice: Subject to any disclaimer, the term of this patent is extended or adjusted under 35 U.S.C. 154(b) by 122 days.

(21) Appl. No.: 16/197,534

(22) Filed: Nov. 21, 2018

Related U.S. Application Data

(63) Continuation-in-part of application No. 16/158,546, filed on Oct. 12, 2018, now abandoned, and a continuation-in-part of application No. 16/157,777, filed on Oct. 18, 2018, and a continuation-in-part of application No. 16/156,254, filed on Oct. 10, 2018, and a continuation-in-part of application No. 16/106,777, filed on Aug. 21, 2018, now abandoned, and a continuation-in-part of application No. 15/618,286, filed on Jun. 9, 2017, and a continuation-in-part of application No. 15/591,459, filed on May 10, 2017.

(60) Provisional application No. 62/572,768, filed on Oct. 16, 2017, provisional application No. 62/571,891, filed on Oct. 13, 2017, provisional application No. 62/571,884, filed on Oct. 13, 2017, provisional application No. 62/548,548, filed on Aug. 22, 2017.

(51) Int. Cl.
*G06K 9/62* (2006.01)
*G06K 9/00* (2006.01)
*G06F 16/9032* (2019.01)
*G06F 16/783* (2019.01)

(52) U.S. Cl.
CPC ....... *G06K 9/6263* (2013.01); *G06F 16/7837* (2019.01); *G06F 16/9032* (2019.01); *G06K 9/00805* (2013.01)

(58) Field of Classification Search
CPC .............. G06K 9/6263; G06K 9/00805; G06F 16/7837; G06F 16/9032
See application file for complete search history.

(56) References Cited

U.S. PATENT DOCUMENTS 9,294,456 B1 * 3/2016 Timmermans ........ H04L 63/083
9,779,309 B1 * 10/2017 Fink ................... G06K 9/00228
(Continued)

*Primary Examiner* — Cam Y T Truong
(74) *Attorney, Agent, or Firm* — Christopher P. Maiorana, PC

(57) ABSTRACT

A system comprising a database and a user device. The database may be configured to (i) store metadata generated in response to objects detected in a video, (ii) store a confidence level associated with the metadata, (iii) provide to a plurality of users (a) data portions of the video and (b) a request for feedback, (iv) receive the feedback and (v) update the confidence level associated with the metadata in response to the feedback. The user device may be configured to (i) view the data portions, (ii) accept input to receive the feedback from one of said plurality of users and (iii) communicate the feedback to the database. The confidence level may indicate a likelihood of correctness of the objects detected in response to video analysis performed on the video. The database may track user statistics for the plurality of users based on the feedback.

19 Claims, 16 Drawing Sheets

(56) References Cited

U.S. PATENT DOCUMENTS

| | | | |
|---|---|---|---|
| 2009/0060342 A1* | 3/2009 | Chiang | G06K 9/00711 382/190 |
| 2010/0306223 A1* | 12/2010 | Lee | G06F 16/24578 707/759 |
| 2012/0179764 A1* | 7/2012 | Erdal | H04L 63/102 709/206 |
| 2013/0110732 A1* | 5/2013 | Uppal | G06Q 10/0635 705/319 |
| 2013/0224718 A1* | 8/2013 | Woodward | G09B 7/00 434/350 |
| 2014/0220540 A1* | 8/2014 | Burgin | G09B 7/07 434/362 |
| 2015/0052115 A1* | 2/2015 | Sharifi | G06F 16/435 707/722 |
| 2015/0066919 A1* | 3/2015 | Park | G06F 16/438 707/724 |
| 2015/0143281 A1* | 5/2015 | Mehta | G06Q 10/10 715/781 |
| 2016/0004991 A1* | 1/2016 | Bloom | G06Q 10/063114 705/7.15 |
| 2017/0103469 A1* | 4/2017 | Jiao | G06Q 50/01 |
| 2017/0126720 A1* | 5/2017 | Olinsky | H04L 67/22 |
| 2017/0186032 A1* | 6/2017 | Rangasamy Kannadasan | G06K 9/4652 |
| 2018/0012460 A1* | 1/2018 | Heitz, III | G08B 13/19684 |

\* cited by examiner

SYSTEM AND METHOD TO INCREASE CONFIDENCE OF ROADWAY OBJECT RECOGNITION THROUGH GAMIFIED DISTRIBUTED HUMAN FEEDBACK

This application relates to U.S. Ser. No. 16/158,546, filed Oct. 12, 2018, which relates to U.S. Provisional Application No. 62/572,768, filed Oct. 16, 2017. This application also relates to U.S. Ser. No. 16/157,777, filed Oct. 11, 2018, which relates to U.S. Provisional Application No. 62/571,891, filed Oct. 13, 2017. This application also relates to U.S. Ser. No. 16/156,254, filed Oct. 10, 2018, which relates to U.S. Provisional Application No. 62/571,884, filed Oct. 13, 2017. This application also relates to U.S. Ser. No. 16/106,777, filed Aug. 21, 2018, which relates to U.S. Provisional Application No. 62/548,548, filed Aug. 22, 2017. This application also relates to U.S. Ser. No. 15/618,286, filed Jun. 9, 2017. This application also relates to U.S. Ser. No. 15/591,459, filed May 10, 2017. Each of the mentioned applications are hereby incorporated by reference in their entirety.

FIELD OF THE INVENTION

The invention relates to video capture generally and, more particularly, to a method and/or apparatus for implementing a system and method to increase confidence of roadway object recognition through gamified distributed human feedback.

BACKGROUND

Smartphones are utilized as interfaces for apps and to interface with other internet-connected technology (i.e., the internet of things) and to make local connections (i.e., device-to-device connections). Smartphones are becoming ubiquitous and many people use smartphones when free time is available.

Generally, object detection is implemented using machine learning techniques that rely on training data for accurate detection and/or classification. Object detection is an evolving process that can be improved using human feedback to check results. However, getting many people to provide feedback can be difficult. Checking the results of an object detection is boring and can be time consuming. Furthermore, while accurate object detection can provide a benefit for many applications, the immediate reward for a person providing human feedback is minimal.

It would be desirable to implement a system and method to increase confidence of roadway object recognition through gamified distributed human feedback.

SUMMARY

The invention concerns a system comprising a database and a user device. The database may be configured to (i) store metadata generated in response to objects detected in a video, (ii) store a confidence level associated with the metadata, (iii) provide to a plurality of users (a) data portions of the video and (b) a request for feedback, (iv) receive the feedback and (v) update the confidence level associated with the metadata in response to the feedback. The user device may be configured to (i) view the data portions, (ii) accept input to receive the feedback from one of said plurality of users and (iii) communicate the feedback to the database. The confidence level may indicate a likelihood of correctness of the objects detected in response to video analysis performed on the video. The database may track user statistics for the plurality of users based on the feedback.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
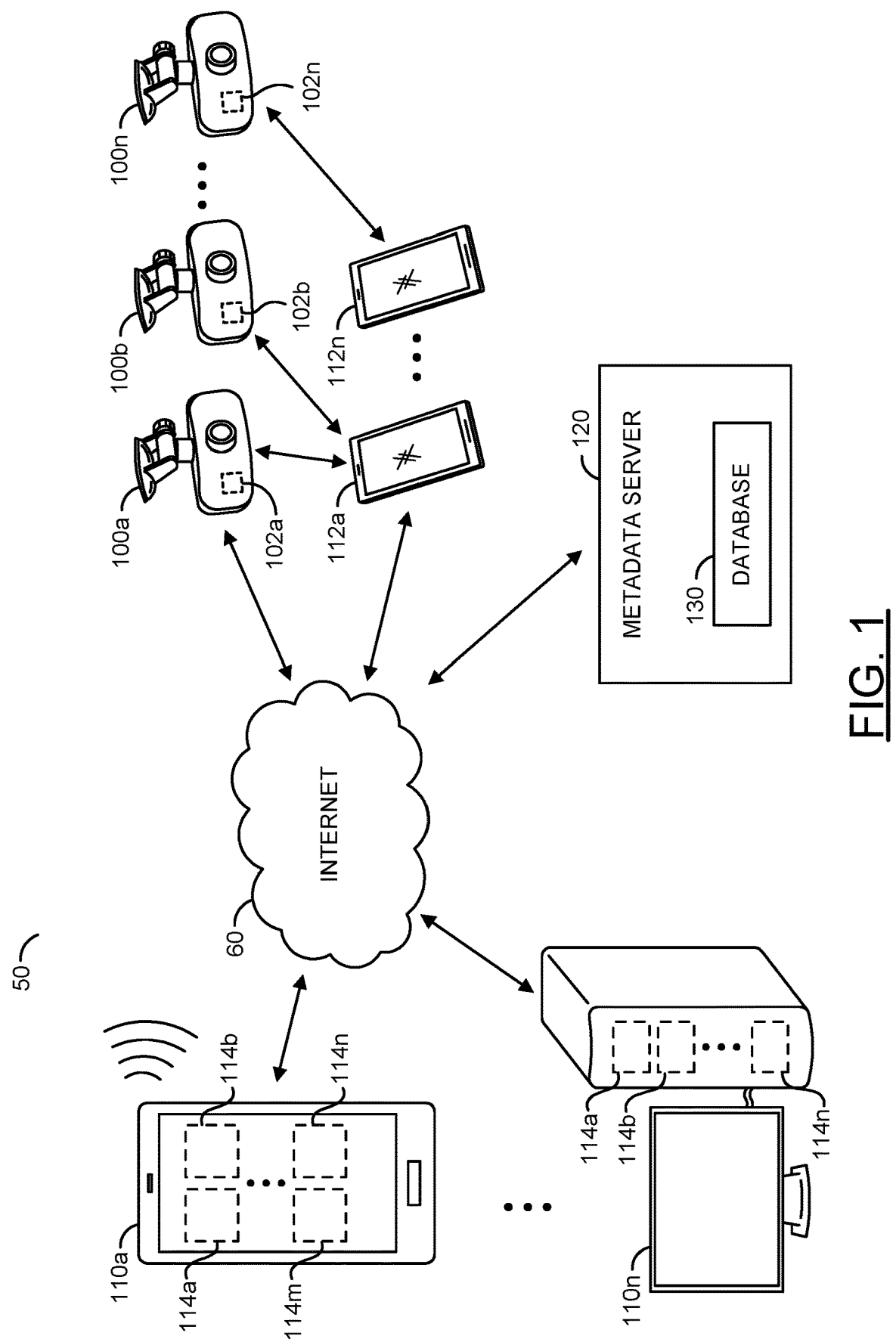
FIG. 1 is a diagram illustrating an example system in accordance with an embodiment of the present invention.

Embodiments of the present invention include providing a system and method to increase confidence of roadway object recognition through gamified distributed human feedback that may (i) receive human feedback for object detection results, (ii) provide a second source of data for low confidence results, (iii) provide an audit for high confidence results, (iv) provide a reward system to motivate users to provide feedback, (v) utilize a smartphone interface, (vi) improve object detection accuracy, (vii) record user statistics, (viii) provide a leaderboard to encourage competition and/or (ix) be implemented as one or more integrated circuits.

The system may be implemented to solicit human feedback on object detection scans performed on video data in order to improve results (e.g., classifications) of the object detection. In one example, the human feedback may be for object detection results that have low confidence (e.g., results generated from video analytics may not have a high confidence level in the classification result of the object detection). In another example, the human feedback may be used for auditing high confidence results of object detection. In some embodiments, the objects detected may be license plate characters and/or information about objects detected in a video frame (e.g., roadway information). For example, the results may be used to implement a real time database of roadway data.

The system may be configured to utilize a smartphone of a driver to both connect with the capture device and connect to a remote server. Since the system utilizes the smartphone, the user interface of the smartphone may be further utilized to provide a companion application. The companion application may provide a graphical interface to enable the user to control various features of the capture device and/or access a user account. The companion application may further provide a gamification element to the system.

The purpose of the gamification aspect would be to keep drivers interested in participating in providing the video data and/or metadata to the system. The gamification aspect may also be used to enable and/or encourage drivers to provide human feedback on some of the machine generated object detection results. The human feedback may be used to improve the confidence levels on some of the low confidence data collected. The human feedback may also be used to correct errors and/or backfill missing data.

In some embodiments, the video analytics techniques may be licensed from a third party. The video analytics techniques may perform the roadway object identification and/or object character recognition. The video analytics techniques may return the objects/characters identified and also a confidence level for the scan. Gamification may be implemented to curate the incoming data and send a portion of the data back to the drivers (e.g., users/players) when the gamification portion of the companion application is opened. The companion app may be configured to present photos to the player and ask the player if the results scanned were accurate. If the driver indicates that the results were not correct, the driver would have the ability to correct the data (e.g., with keyboard/touchscreen input and/or a bullet point entry).

The apparatus may be configured to let drivers that use the capture device and/or the accompanying companion app compete against each other. The gamification aspect of the app may be used when not driving (e.g., use while driving may be restricted). For example, the gamification app may provide still images and ask the drivers questions (e.g., confirm a license plate number, confirm a color of a vehicle, confirm a state of a plate, etc.). The system may use answers from the drivers as feedback to improve the confidence of video analytics results (e.g., machine learning with human input as feedback). The game part would let drivers compete with each other by answering the most questions and/or rating players based on various scoring metrics (e.g., speed, accuracy, category, etc.).

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement video capture devices. The blocks 110a-110n may implement subscriber devices (e.g., subscriber communication devices). The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 110a-110n and/or the user communication devices 112a-112n may be configured to execute computer readable instructions (e.g., executable programs, apps, binaries, etc.). For example, the subscriber devices 110a-110n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 110a-110n and/or the user communication devices 112a-112n may be implemented as a vehicle capable of 3G/4G/LTE/5G communication (e.g., a vehicle with a touchscreen infotainment system). Generally, the subscriber devices 110a-110n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 110a-110n and/or the user communication devices 112a-112n may have similar implementations. For example, the user communication devices 112a-112n may be wireless communication devices. The type and/or features of the subscriber devices 110a-110n and/or the user communication devices 112a-112n may be varied according to the design criteria of a particular implementation.

Each of the subscriber devices 110a-110n may be configured to connect to the network 60 (e.g., hard-wired, Wi-Fi, etc.). The subscriber devices 110a-110n may be configured to store and/or execute the computer readable instructions 114a-114n. Executing the computer readable instructions 114a-114n may enable the subscriber devices 110a-110n to display various interfaces, generate output and/or receive input. For example, the app 114a may be a front-end for interacting with the system 50.

Each of the capture devices 100a-100n may be configured to capture video data. In some embodiments, the capture devices 100a-100n may be implemented as vehicle-mounted cameras (e.g., dashcams) to record video while a user drives the vehicle. In one example, each vehicle may be equipped with one of the capture devices 100a-100n. In another example, one vehicle may be equipped with more than one of the capture devices 100a-100n (e.g., to capture multiple fields of view and/or perspectives from the vehicle). In some embodiments, the capture devices 100a-100n may be cameras mounted at stationary locations (e.g., security cameras mounted on buildings). For example, the stationary camera may generate metadata used to determine roadway data. The implementation of the capture devices 100a-100n may be varied according to the design criteria of a particular implementation.

In some embodiments, the capture devices 100a-100n may be configured to communicate directly with the network 60. For example, the capture devices 100a-100n may comprise components implementing Wi-Fi communication and/or 3G/4G/LTE/5G (e.g., cellular) communication. In some embodiments, the capture devices 100a-100n may be configured to communicate indirectly with the network 60.

For example, the capture devices 100a-100n may comprise short-range communication such as Bluetooth and/or Wi-Fi (e.g., short-range communication to a tethered device such as a smartphone). A cost of manufacturing the capture devices 100a-100n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 100a-100n may be lower when Bluetooth alone and/or Bluetooth/Wi-Fi is implemented compared to a camera that implements 3G/4G/LTE/5G hardware. Implementing the capture devices 100a-100n with a low cost may enable users to buy more than one of the capture devices 100a-100n and/or provide a larger user base. When the system 50 has more of the capture devices 100a-100n available to capture video data and/or provide metadata, more data points may be available for analysis. Generally, having more data points enables more useful analytical results generated by the system 50. In some embodiments, the capture devices 100a-100n may comprise a display and/or an input interface. For example, the capture devices 100a-100n may be configured to run apps (e.g., the computer executable instructions 114a-114n). In another example, the capture devices 100a-100n may be implemented as smartphones configured as cameras.

Each of the user communication devices 112a-112n may be configured to connect to the network 60 and/or the capture devices 100a-100n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, ZigBee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 100a-100n. In some embodiments, the user communication devices 112a-112n may be configured to send/receive data to/from the internet 60. For example, the user communication devices 112a-112n may receive data (e.g., video data, metadata, etc.) from one or more of the capture devices 100a-100n and transmit the data to the internet 60. In another example, the user communication devices 112a-112n may receive data (e.g., data requests, interrupt requests, firmware updates, etc.) from the internet 60 and transmit the data to the capture devices 100a-100n.

Generally, the user communication devices 112a-112n are implemented as portable devices (e.g., carried by a person, mounted in a vehicle, battery powered, etc.). The user communication devices 112a-112n may be configured to execute the computer readable instructions 114a-114n. In one example, the subscriber devices 110a-110n may store and/or execute one version (e.g., a subscriber version) of an app (e.g., the computer readable instructions 114a) and the user communication devices 112a-112n may store and/or execute another version (e.g., a provider version) of an app (e.g., the computer readable instructions 114b). One of the user communication devices 112a-112n may be configured to communicate with more than one of the capture devices 100a-100n (e.g., one smartphone may connect to multiple vehicle-mounted cameras in the same vehicle). In the example shown, the smartphone 112a communicates with the capture device 100a and the capture device 100b (e.g., the driver may have the smartphone and the vehicle may have two vehicle-mounted cameras). The connections between the user communication devices 112a-112n and/or the capture devices 100a-100n may be varied according to the design criteria of a particular implementation.

Each of the capture devices 100a-100n may comprise a respective block (or circuit) 102a-102n. The circuits 102a-102n may implement video processor functionality. In some embodiments, the circuits 102a-102n may be a system-on-chip (SoC). For example, the circuits 102a-102n may comprise input/output, a memory, processors, etc. The components and/or functionality of the circuits 102a-102n may be varied according to the design criteria of a particular implementation.

The circuits 102a-102n may be configured to record, encode, decode, transmit and/or store video data. The circuits 102a-102n may be configured to perform video analysis and/or video analytics. For example, the circuits 102a-102n may process video, identify patterns in the video data and/or recognize objects captured by the video data. Heuristics, templates and/or comparisons may be performed by the circuits 102a-102n to recognize and/or identify objects in captured video frames (e.g., video data) as objects that can be perceived by humans. In one example, the circuits 102a-102n may identify an object as a vehicle (or part of a vehicle such as a hood, a license plate, etc.). In another example, the circuits 102a-102n may identify text, shapes and/or colors. In yet another example, the circuits 102a-102n may identify objects (e.g., signs, pedestrians, street lights, etc.). The video data captured by the circuits 102a-102n may be stored by the capture devices 100a-100n. In one example, the circuits 102a-102n may implement a memory. In another example, the circuits 102a-102n may connect to an external memory (e.g., the capture devices 100a-100n may be configured to receive a flash memory such as a SD card, a microSD card, NAND memory, Compact Flash (CF) and/or an XD card).

The circuits 102a-102n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 102a-102n may comprise a GPS unit to determine GPS coordinates, a magnetometer to determine direction of travel and/or a real time clock (RTC) circuit to determine time.

The circuits 102a-102n may be configured to detect license plates. License plates may be detected, and the alphanumeric characters and/or symbols on the license plate may be identified. The license plate alphanumeric characters and/or symbols may be extracted from the captured video data as the metadata. For example, the circuits 102a-102n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 102a-102n when the video was recorded. The circuits 102a-102n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, JavaScript, PHP, SQL, AJAX applications, APIs, etc. The server 120 may be configured to distribute apps (e.g., one or more of the computer readable instructions 114a-114n) to the subscriber devices 110a-110n and/or the user communication devices 112a-112n. The server 120 may be configured to generate interfaces (e.g., graphical user interfaces) based on stored data for the subscriber devices 110a-110n. For example, the server 120 may generate data to implement an interface, the data may be sent to the subscriber devices 110a-110n, the subscriber devices 110a-110n may interpret the data to generate a user interface, the user may interact with the user interface to provide requests, the subscriber devices 110a-110n may transmit the requests to the server 120 and the server may process the requests. Similarly, the capture devices 100a-100n and/or the user communication devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 100a-100n. In an example, the database 130 may store the metadata. Search parameters may be transmitted by the subscriber devices 110a-110n and the database 130 may be searched based on the search parameters. For example, the database 130 may enable the metadata to be associated with the video data stored by (and located on) the capture devices 100a-100n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 100a-100n to program participants (e.g., the users and/or the data producers). The data producers may install the capture devices 100a-100n. For example, the data producers may install the capture devices 100a-100n on vehicles as dashcams. The capture devices 100a-100n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 100a-100n).

The data producers may use the capture devices 100a-100n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 110a-110n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 110a-110n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 110a-110n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 100a-100n captured the video based on the video metadata (e.g., the metadata may comprise an ID of a camera and/or user that captured the video). The server 120 may send a request to the user communication devices 112a-112n and/or the capture devices 100a-100n to upload the recorded video. If the capture devices 100a-100n still have the requested video stored, a video upload may be initiated. The recorded video may be trickled (e.g., uploaded as a low priority data transfer) from the corresponding one of the capture devices 100a-100n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 100a-100n may be implemented with inexpensive hardware powerful enough to perform video analytics (e.g., license plate recognition (LPR)). The video analytics may be performed in real time, while capturing the video data. In one example, the capture devices 100a-100n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 100a-100n into a money making tool. For example, in the system 50 the drivers may own the capture devices 100a-100n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 100a-100n may be configured to overwrite stored video as new video data is captured (e.g., a loop recording). In an example of 40 hours of driving per week with the capture devices 100a-100n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 100a-100n. The provider of the system 50 may curate the resulting data generated by the data providers.

Figure 2:
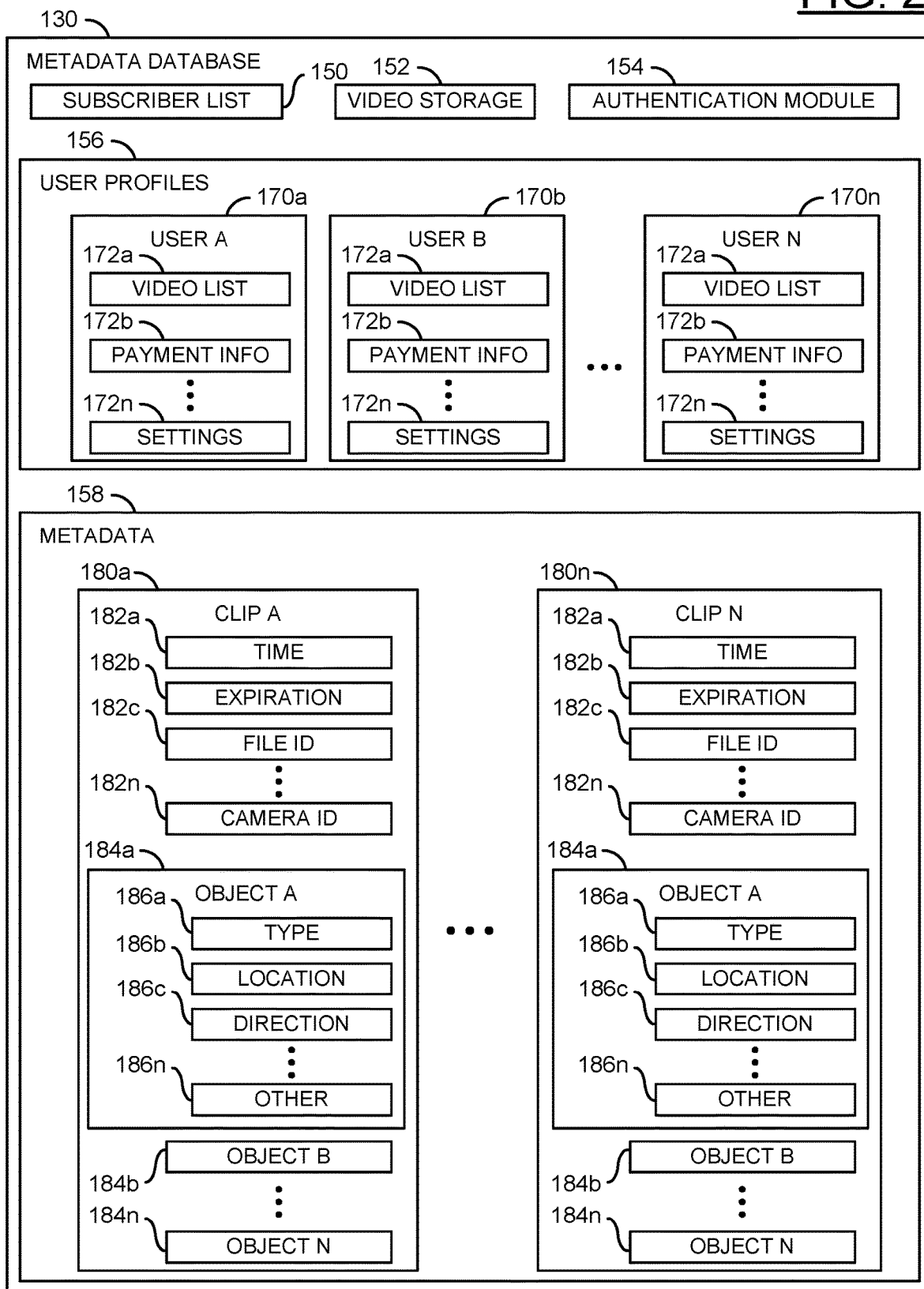
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156 and/or a block (or circuit) 158. The block 150 may comprise a subscriber list. The block 152 may comprise video storage. The block 154 may comprise an authentication module. The block 156 may comprise user profiles. The block 158 may comprise plate and/or object metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 114a to enable the subscriber user to access the database 130 from the subscriber device 110a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 100a-100n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 110a-110n by providing a username, a password, and an additional key (e.g., a text message with a passcode provided to the smartphone 110a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172a may be used to send a request to the capture devices 100a-100n and/or the user communication devices 112a-112n to upload the recorded video data. In another example, the video list 172a may be used to provide a payment to the particular data provider that captured the requested video data. In an example, the data set 172b may store payment information. The payment information 172b may associate credit card, electronic payment (e.g., PayPal, Bitcoin, Apple Pay, Google Wallet, etc.) and/or bank information with a particular one of the data provider users. The payment information 172b may be used to facilitate payments to the data provider that has uploaded a requested recorded video.

In some embodiments, the data provider may receive one of the capture devices 100a-100n in exchange for providing the payment information 172b and if enough video data is provided (e.g., provided on a consistent basis) the data collector user may not be charged. If the capture device is not used enough (or not used regularly, a charge may be incurred (e.g., due to inactivity). In an example, the data provider may receive one of the capture devices 100a-100n free of charge and be able to use the camera as a regular dashcam as well as for providing data for the system 50. In one example, the data provider may not be charged for one of the capture devices 100a-100n for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172b may be stored to charge a penalty fee to encourage the data provider to provide data.

In an example, the data set 172n may comprise user settings. The user settings 172n may provide a configuration and/or preferences for each of the data providers 170a-170n. The data sets 172a-172n may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172a-172n of each of the data provider profiles 170a-170n may be varied according to the design criteria of a particular implementation.

The metadata 158 may store information about various captured videos (e.g., video clips) 180a-180n. The video clips 180a-180n may not be the actual video data (e.g., the actual video data may be stored with the video storage 152). The video clips 180a-180n may comprise information about the video clips and/or information about objects detected in the video clips by the capture devices 100a-100n.

In some embodiments, each video clip metadata 180a-180n that is captured and/or uploaded by the capture devices 100a-100n may be stored by the database 130. The video data associated with the video clip metadata 180a-180n may be stored in the video storage 152. Generally, the video data in the video storage 152 may be stored temporarily. For example, video data may have a relatively large file size and storing video data indefinitely may be impractical. However, the video clip metadata 180a-180n may have a much smaller file size than the video data. The video clip metadata 180a-180n may be configured to provide sufficient information about the video data to re-create the positioning of various objects in the video data even after the video data is no longer available.

Every time video data is uploaded to the database 130, the corresponding video metadata 180a-180n may be stored by the database 130. The video metadata 180a-180n may be stored long-term compared to the video data. In some embodiments, the metadata 158 may be organized by detected objects instead of the video clip metadata 180a-180n. In one example, where the objects detected are license plates, each time a license plate is detected a new metadata entry may be created. For example, each of the license plate entries may comprise the associated clips 180a-180n. The clips 180a-180n may comprise metadata entries for each time a license plate has been read by one of the capture devices 100a-100n. For example, each time a license plate is detected, a new one of the clips 180a-180n may be appended to the corresponding one of the license plate entries. Similarly, if the objects detected are vehicles then the video clips 180a-180n may be associated with a particular vehicle. The arrangement of the metadata 158 may be varied according to the design criteria of a particular implementation.

Each video clip 180a-180n is shown comprising metadata 182a-182n. The clip metadata 182a-182n may comprise the data extracted by the capture devices 100a-100n from the video recorded by the capture devices 100a-100n and/or data associated with the video recorded by the capture devices 100a-100n. The video clip metadata 182a-182n may be configured to provide useful information about the video clips that have been uploaded.

In one example, the video clip metadata 182a may comprise a time. The time 182a may indicate a date and/or time of day when the corresponding video was recorded (e.g., a timestamp). The time 182a may be used to find recorded video that occurred at a particular time. In another example, the video metadata 182b may comprise an expiration flag. The expiration flag 182b may indicate whether or not the recorded video is still available (e.g., stored in the memory of the capture device, stored in the video storage 152, has not been overwritten, etc.). For example, the expiration flag 182b may have a particular value (e.g., a logical one value) if the video has been overwritten. If the expiration flag 182b indicates that the recorded video is no longer available, the video clip metadata 180a-180n may still provide useful information. The video clip metadata 182c may provide a file ID. The file ID 182c may be used to associate the video clip metadata 180a-180n to a particular stored video file (e.g., either in the video storage 152 and/or in the memory of the cameras 100a-100n). For example, if the expiration flag 182b indicates the video data is still available then the file ID 182c may be used to retrieve the video data. The video clip metadata 182n may provide a camera ID. The camera ID 182n may be used to associate the video clip metadata 180a-180n to a particular one of the cameras 100a-100n (e.g., the camera that captured the video data associated with the metadata). The camera ID 182n may enable the video data to be retrieved from the capture devices 100a-100n (if the video is still available) and/or to enable the data provider to be contacted for more information (or provide payment to the data provider user). The number and/or type of video clip metadata 182a-182n available may be varied according to the design criteria of a particular implementation.

The video clip metadata 180a-180n may comprise a number of objects 184a-184n. The objects 184a-184n may correspond to each object detected using the video analysis performed by the capture devices 100a-100n. In one example, the object 184a may be a particular vehicle detected in the video data. In another example, the object 184b may be a particular pedestrian detected in the video data. In yet another example, the object 184c may be a license plate detected in the video data. In still another example, the object 184n may be a particular sign and/or landmark detected in the video data. The number and/or types of objects 184a-184n stored with the video clip metadata 180a-180n may be varied according to the design criteria of a particular implementation.

Each of the objects 184a-184n may have associated object information 186a-186n. In an example, the object information 186a may correspond to an object type (e.g., a person, a vehicle, a building, a sign, a billboard, a license plate, etc.). The object type 186a may provide details about the associated objects 184a-184n. In one example, if the object is a vehicle, the object type 186a may indicate the make, model, year, color, license plate, number of passengers, distinctive markings, etc. The object information 186b may correspond to a location. The location 186b may comprise GPS coordinates corresponding to the object in the recorded video. The location 186b may be used to find recorded video that was captured at a particular location (e.g., at an intersection at a particular time). In some embodiments, the location 186b may comprise an absolute location of the objects 184a-184n. For example, the absolute location 186b may be determined by the video analysis performed by the capture devices 100a-100n to determine the actual coordinates of the objects detected instead of merely the GPS coordinates of the capture devices 100a-100n. In some embodiments, the location 186b may be the location of the object within the video frame (e.g., the distance of the object from the camera lens determined by the capture devices 100a-100n using video analysis).

The object information 186c may comprise a direction. In some embodiments, the direction 186c may indicate the direction of travel of the objects 184a-184n (or if the objects 184a-184n are stationary). For example, the direction 186c may be determined by the capture devices 100a-100n analyzing a sequence of video frames to determine where the object is moving over time. In some embodiments, the direction 186c may be the direction that the capture device 186a-186n was facing when the video data was captured. For example, the information from the location 186b and the direction 186c may be combined to determine the absolute location coordinates of the objects 184a-184n. Other types of metadata 186n may be stored about the objects 184a-184n. The types and/or amount of object information 186a-186n may be varied according to the design criteria of a particular implementation.

The information stored about the video clips 180a-180n may be used to identify vehicles, times, locations and/or other data about the recorded videos. The video clip metadata 180a-180n may be the data checked by the database 130 to determine results for a search query from the subscriber users. The video metadata 180a-180n may be used to approximate what may be recorded and/or visible when viewing the corresponding recorded video. The storage format for the metadata 158 may be implemented to enable re-enact and/or re-creating a scene (e.g., the vehicle locations) after the video data has expired (e.g., re-creating the arrangement of the objects when the video data is no longer available).

The circuits 102a-102n may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition). The circuits 102a-102n may be configured to determine roadway data in real time. In one example, the object information 186a-186n may store information corresponding to a type of vehicle detected (e.g., color of a car, make of a vehicle, model of a vehicle, year of a vehicle, speed of a vehicle, etc.). In another example, the object information 186a-186n may comprise roadway data (e.g., a lamp post detected, a street sign detected, a shape of a roadway detected, conditions of the road detected, etc.).

The database 130 may be configured to index the video metadata and/or associate new video metadata with license plate numbers and/or objects in real time. The database 130 may arrange the data to enable efficient filtering of information to provide fast search results for the subscriber users. In the example shown, the metadata 158 is arranged according to the video clips 180a-180n. In another example, the metadata 158 may be arranged based on a time, a location, a camera ID, etc.). The arrangement of the storage of the data in the database 130 may be varied according to the design criteria of a particular implementation.

The database 130 may be configured to create a database entry for each incoming video clip. In one example, the video metadata 182a-182n for the clip 180a may comprise information such as id="1", lp="5SAM333", date="20170307", time="14:30", alt="141.46354", lat="37.804440" and/or lng="−122.422874". In another example, the video metadata 182a-182n for the clip 180i may comprise information such as id="2", lp="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database may implement one file for each license plate 180a-180n to avoid parsing all stored data in order to filter out license plate results in real time.

Figure 3:
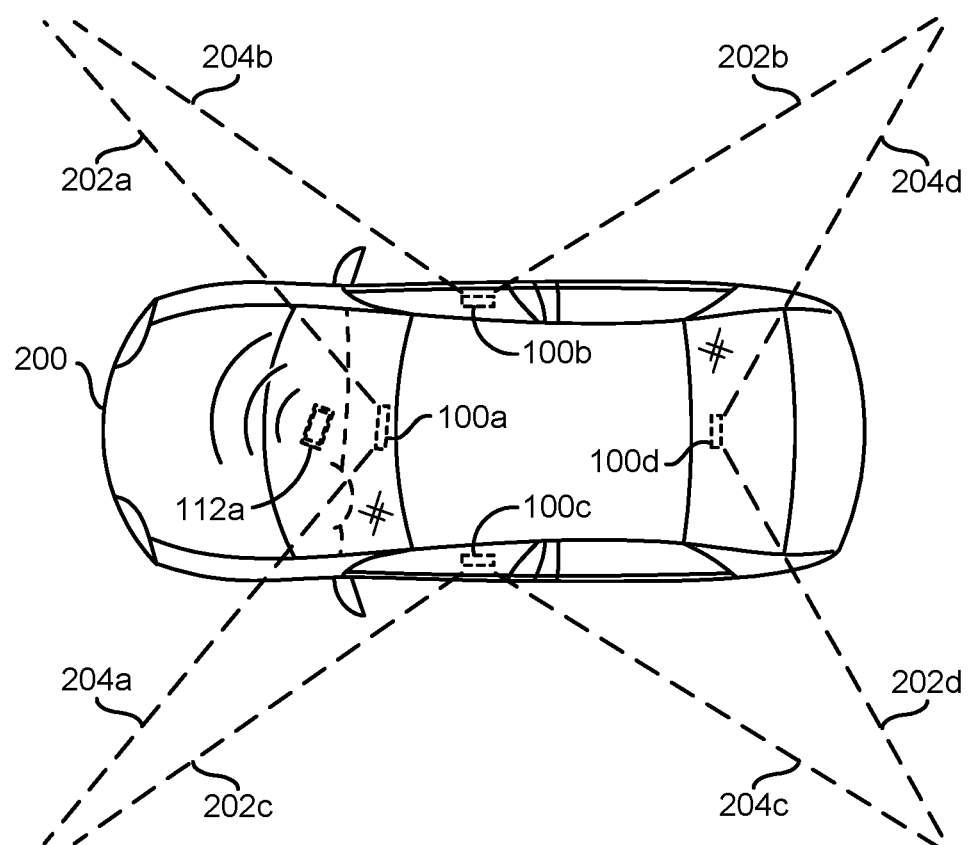
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 100a-100n. In the example shown, the capture device 100a may be installed facing the direction of travel of the vehicle 200, the capture device 100b may be installed directed away from a passenger side of the vehicle 200, the capture device 100c may be installed directed away from a driver side of the vehicle 200 and the capture device 100d may be installed directed facing opposite from the direction of travel of the vehicle 200.

The user communication device 112a is shown in the vehicle 200. In the example shown, the user communication device 112a may be a smartphone communicating to the network 60 (e.g., via a 3G/4G/LTE/5G wireless connection). For example, each of the installed cameras 100a-100d may communicate with the smartphone 112a (e.g., creating a local network) and the smartphone 112a may communicate with the external network 60. In the example shown, the capture devices 100a-100d may be positioned on the windows of the front, side and back of the vehicle 200 (e.g., suction cupped from the inside of the vehicle 200). The number, installation and/or locations of the capture devices 100a-100n in a vehicle may be varied according to the design criteria of a particular implementation and/or a preference of the data provider.

A line 202a and a line 204a are shown extending from the capture device 100a. The line 202a and the line 204a may represent a field of view captured by the capture device 100a. The field of view of the capture device 100a may record video of a view from the front of the vehicle 200 (e.g., from a perspective of a front of the vehicle 200). A line 202b and a line 204b are shown extending from the capture device 100b. The line 202b and the line 204b may represent a field of view captured by the capture device 100b. The field of view of the capture device 100b may record video of the view from the right of the vehicle 200 (e.g., from a perspective of a passenger side of the vehicle 200). A line 202c and a line 204c are shown extending from the capture device 100c. The line 202c and the line 204c may represent a field of view captured by the capture device 100c. The field of view of the capture device 100c may record video of the view from the left of the vehicle 200 (e.g., from a perspective of a driver side of the vehicle 200). A line 202d and a line 204d are shown extending from the capture device 100d. The line 202d and the line 204d may represent a field of view captured by the capture device 100d. The field of view of the capture device 100d may record video of the view from the rear of the vehicle 200 (e.g., from a perspective of a back of the vehicle 200).

The vehicle 200 may have a number of the capture devices 100a-100n installed. In the example shown, four of the capture devices 100a-100n may be installed. For example, the cameras may be directed for a "drive mode" (e.g., the camera 100a directed forward, and the camera 100d directed backwards) and the cameras may be directed for a "trawl mode" (e.g., the camera 100b and the camera 100c each directed sideways). For example, the trawl mode may be useful when in parking lots. The number of the capture devices 100a-100n installed on the vehicle 200 may be varied according to the design criteria of a particular implementation.

Figure 4:
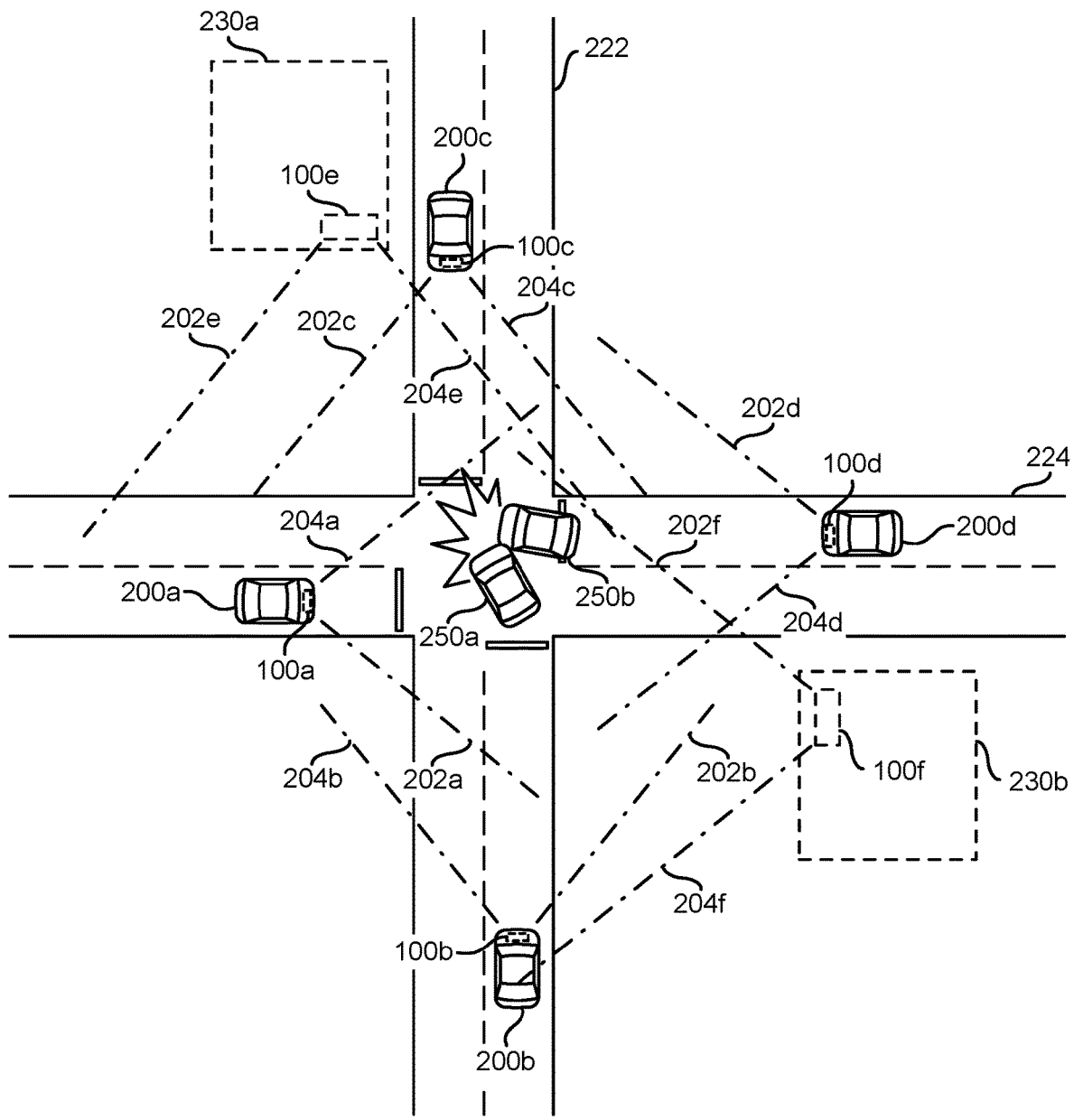
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 100a installed, the vehicle 200b may have the capture device 100b installed, the vehicle 200c may have the capture device 100c installed and/or the vehicle 200d may have the capture device 100d installed. The drivers of the vehicle 200a, the vehicle 200b, the vehicle 200c and/or the vehicle 200d may be data providers. A building 230a and a building 230b are shown. The building 230a may have the capture device 100e installed and the building 230b may have the capture device 100f installed as a security camera. In some embodiments, one or more of the capture devices 100a-100n may be implemented as stationary cameras. The owner of the building 230a and the owner of the building 230b may be data providers for the system 50 (e.g., capture video of the event 220).

The capture device 100a may capture one field of view (e.g., the line 202a and the line 204a) from the viewpoint of the vehicle 200a. The capture device 100b may capture one field of view (e.g., the line 202b and the line 204b) from the viewpoint of the vehicle 200b. The capture device 100c may capture one field of view (e.g., the line 202c and the line 204c) from the viewpoint of the vehicle 200c. The capture device 100d may capture one field of view (e.g., the line 202d and the line 204d) from the viewpoint of the vehicle 200d. The capture device 100e may capture one field of view (e.g., the line 202e and the line 204e) from the viewpoint of the building 230a. The capture device 100f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 100a-100f of the event 220. For example, the database 130 may receive six different user IDs of the data provider users. The database 130 may receive six slightly different GPS coordinates corresponding to the different locations of the cameras 100a-100f. In some embodiments, the database 130 may receive the same timestamp from each of the capture device 100a-100f. In some embodiments, the timestamp may be slightly different because the video files may be stored as video clips having a pre-determined time (e.g., 2 minute video clips) and the start and end time of each video clip may depend on when the cameras 100a-100f were booted up (e.g., when the vehicles 200a-200d were started). In some embodiments, system 50 may be configured to synchronize the time on each of the capture devices 100a-100n (e.g., to ensure the timestamp for a start and end time of each video clip matches between the capture devices 100a-100n). The database 130 may receive up to 6 different direction metadata information. In some embodiments, multiple clips 180a-180n with metadata information 182a-182n and/or object information 186a-186n for each object detected may be received (e.g., depending on the length of the event 220).

The video metadata from each of the cameras 100a-100f may be uploaded to the database 130. Since two vehicles (e.g., 250a-250b) are in the car accident, the database 130 may associate at least the objects 184a-184b with two license plates and/or vehicle type entries (e.g., 184a for the vehicle 250a and 184b for the vehicle 250b). Depending on the fields of view, some of the cameras 100a-100n may not capture both license plates and/or vehicles (e.g., the field of view of the camera 100b may capture the license plate of the vehicle 250a but not capture the license plate of the vehicle 250b). License plate entries may be made for the data provider vehicles 200a-200d (e.g., the capture device 100a may capture the license plate of the vehicle 200d). Additional license plate and/or vehicle entries may be made for other objects and/or vehicles captured (e.g., the capture device 100b may capture the colliding vehicles 250a-250b as well as the vehicle 200a).

The metadata 158 may be extracted from the video data captured by each of the capture devices 100a-100n. The video metadata 158 may be associated with the video clips 180a-180n corresponding to each field of view captured. In one example, the video clip 180a may correspond to the metadata associated with the video data captured by the capture device 100a. In another example, the video clip 180b may correspond to the metadata associated with the video data generated by the capture device 100b. In one example, the object 184a may correspond with the vehicle 250a captured by the capture device 100a and associated with the video clip 180a and the object 184b may correspond to the vehicle 250b captured by the capture device 100a and associated with the video clip 180a. In another example, the object 184a may correspond with the vehicle 250b captured by the capture device 100b and associated with the video clip 180b and the object 184b may correspond to the vehicle 250a captured by the capture device 100b and associated with the video clip 180b. The subscriber users may use the subscriber devices 110a-110n (e.g., via the app and/or web interface 114a) to search the metadata 184a-184n to view any videos that may have been captured of the event 220.

In some embodiments, the capture devices 100a-100n may implement Wi-Fi communication (e.g., to transmit the metadata and/or the recorded videos to the network 60). Implementing the Bluetooth communication to transfer data between the capture devices 100a-100n and the user communication devices 112a-112n may be useful in the vehicles (e.g., 200a-200d) to forward metadata and/or recorded videos to the network 60. In some embodiments, the capture devices 100a-100n may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 100a-100n could be placed to face out a window of a home and/or business (e.g., similar to a consumer IP camera). Connecting the capture devices 100a-100n to a Wi-Fi access point may enable the cameras 100a-100n to operate like a consumer IP Camera but additionally provide the video clip metadata 180a-180n (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 100a-100n in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250a, the driver of the vehicle 250b, an insurance company representing the drivers of the vehicles 250a-250b, and/or another user) searches the video clips 180a-180n in the database 130, a list of videos of the event 220 may be provided. If the subscriber user decides to request a video recording of the event, the server 120 may send a request to one or more of the capture devices 100a-100n (or the associated user communication device 112a-112n). The circuits 102a-102n may set a flag for the requested video in response to the request from the server 120. Setting the flag for the requested video may be used to preserve the requested video recording (e.g., prevent the video from being over-written). The capture devices 100a-100n and/or the user communication devices 112a-112n may upload the video data to the server 120. In some embodiments, the associated video may be preserved for all data points that may be returned as search results of a search query. For example, the server 120 may send the request to one or more of the capture devices 100a-100n (or the associated user communication device 112a-112n) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 100a-100n that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 100a-100n in the vicinity may start preserving data. In one example, if the VIP event is happening presently, the video data being currently recorded may be preserved. In another example, the video data currently residing in the memory of the capture devices 100a-100n associated with the time of the event may be preserved (e.g., a crime is reported after the event occurs and later an interrupt request is provided to the capture devices 100a-100n to preserve potential evidence).

In some embodiments, the video metadata 182a-182b and/or the object information 186a-186n associated with each of the objects 184a-184n may enable the event 220 to be re-created, even if the video data is no longer available (e.g., expired, overwritten, etc.). For example, the object information 186a-186n may be used for each of the objects 184a-184n of each of the video clips 180a-180n associated with the event 220 (e.g., based on a timestamp and/or general location) to determine the absolute location of each of the vehicles 200a-200d and/or the colliding vehicles 250a-250b. Even if the video data is no longer available, the object information 186a-186bn may provide detailed absolute coordinate information over a sequence of time. For example, the detailed absolute coordinate information may be used to indicate where each of the colliding vehicles 250a-250b were before, during and after the event 220. For example, by analyzing the absolute location coordinates over a sequence of time, the speed, direction of travel, the timing of the event 220 and/or other information about the colliding vehicles 250a-250b may be determined to re-create the event 220.

Figure 5:
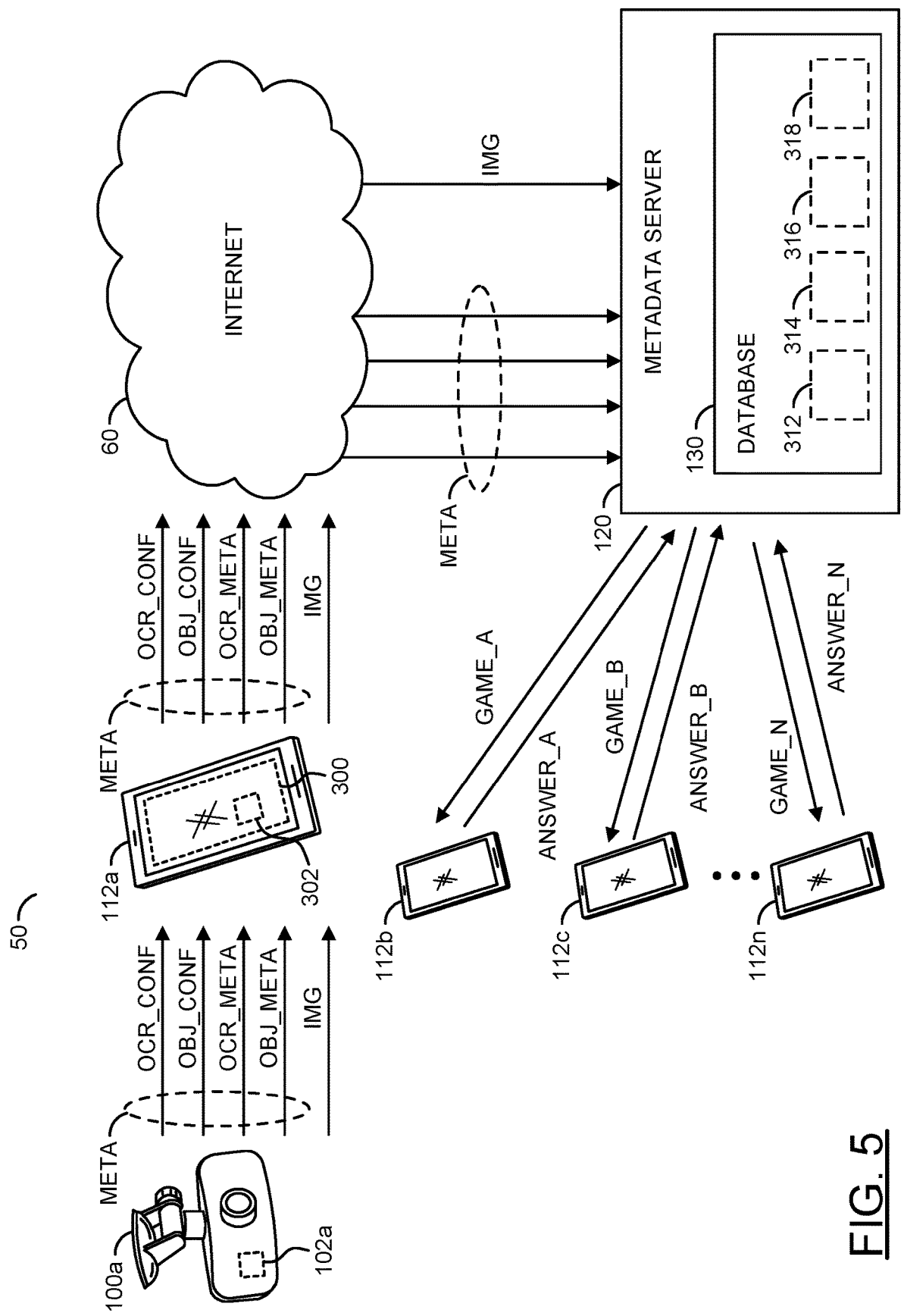
FIG. 5 is a diagram illustrating communication between a database, a capture device, and a wireless communication device.

Referring to FIG. 5, a diagram illustrating communication between the database 130, the capture device 100a, and one of the wireless communication devices 112a is shown. In the example shown, a portion of the system 50 comprising the capture device 100a, the user device 112a, the network 60, the server 120 and a number of the user devices 112b-112n are illustrated as a representative example. For example, the system 50 generally comprises multiple capture devices 100a-100n each configured to provide data to the server 120. A number of signals are shown being communicated between the components of the system 50. The number and/or types of data transmitted in each of the signals may be varied according to the design criteria of a particular implementation.

The video capture device 100a may be capturing video data and/or uploading metadata. The circuit 102a may be configured to communicate process, encode, store and/or perform video analytics on the captured video data. Results of the video analytics may be communicated as a signal (e.g., META). Data portions of the captured video data may be communicated as a signal (e.g., IMG). In an example, the signal META may comprise data that may be stored by the database 130 as the metadata 158. In an example, the signal IMG may be a still image of the captured video data that corresponds to the communicated metadata. The capture device 100a is shown presenting the signal META and/or the signal IMG to the user device 112a. The capture device 100a may present and/or receive other signals (not shown). For example, the capture device 100a may be configured to communicate the video data.

The user device 112a is shown receiving the signal META and/or the signal IMG from the capture device 100a. The user device 112a is shown presenting the signal META and/or the signal IMG to the network 60. The user device 112a may present and/or receive other signals (not shown).

The network 60 is shown receiving the signal META and/or the signal IMG from the user device 112a. The network 60 is shown presenting the signal META and/or the signal IMG to the metadata server 120. The network 60 may present and/or receive other signals (not shown). In the example shown, the user device 112a and the network 60 may be used to forward the signal META from the capture device 100a to the metadata server 120.

The server 120 is shown receiving the signal META and/or the signal IMG from the network 60. The server 120 is shown receiving a number of signals (e.g., ANSWER_A-ANSWER_N) from the user devices 112b-112n. The server 120 is shown presenting a number of signals (e.g., GAME_A-GAME_N) to the user devices 112b-112n. The metadata server 120 may present and/or receive other signals (not shown). In the example shown, the signals GAME_A-GAME_N and/or the signals ANSWER_A-ANSWER_N are shown transmitted directly between the user devices 112b-112n and the server 120. However, the signals GAME_A-GAME_N and/or the signals ANSWER_A-ANSWER_N may be communicated through the network 60.

The user devices 112b-112n are each shown receiving one of the signals GAME_A-GAME_N from the metadata server 120. The user devices 112b-112n are each shown presenting one of the signals ANSWER_A-ANSWER_N to the metadata server 120. The user devices 112b-112n may present and/or receive other signals (not shown).

In the example shown, the user device 112a is shown presenting the signal META. However, the user device 112a may further receive one of the signals GAME_A-GAME_N and present one of the signals ANSWER_A-ANSWER_N. For example, a driver may also be a player that provides feedback. Generally, the ability to provide feedback may be prevented while the player is driving. In some embodiments, the player may be allowed to capture video and provide feedback if the player is parked (e.g., waiting at a pick-up queue and not driving).

The signal META may comprise information that may be stored as the metadata 158 (e.g., generated by the cameras 100a-100n in response to the video analysis) that may be stored and/or indexed in the database 130. The capture device 100a may implement a short-range, inexpensive and/or low power consumption communications protocol (e.g., Bluetooth) to communicate with the user device 112a. The user device 112a may forward the signal META and/or the signal IMG to the network 60. The network 60 may transmit the signal META and/or the signal IMG to the server 120 for storage in the database 130. In some embodiments, since the amount of data communicated in the signal META and/or the signal IMG may be relatively small (e.g., compared to a video file), the user device 112a may not need to wait until bandwidth and/or data usage restrictions are not in place to communicate with the network 60.

In the example shown, the signal META may comprise a signal (e.g., OCR_CONF), a signal (OBJ_CONF), a signal (e.g., OCR_META) and/or a signal (OBJ_META). The signal META may comprise other signal components (not shown). The signal OCR_CONF may represent a confidence level output corresponding to characters of any license plates detected in the captured video frames. The signal OBJ_CONF may represent a confidence level output corresponding to any objects detected in the captured video frames (e.g., roadway information). The signal OCR_META may represent metadata generated by the video analytics module of the circuit 102a in response to the video detection corresponding to license plates. The signal OBJ_META may represent metadata generated by the video analytics module of the circuit 102a in response to the video detection corresponding to objects (e.g., roadway information, vehicles, pedestrians, etc.).

The circuits 102a-102n may be configured to generate the metadata (e.g., the signal OCR_META and/or the signal OBJ_META) associated with objects detected in the video frames captured by the cameras 100a-100n. The circuits 102a-102n may be further configured to provide a confidence level of the detection (e.g., OCR_CONF and/or OBJ_CONF). The confidence level may represent a likelihood that the metadata generated is correct.

In one example, if all characters of a license plate are readable, the confidence level of the OCR performed may be high. In another example, if one or more characters are obscured or appear similar to another character, the confidence level of the OCR performed may be low. In yet another example, if one of the characters is obscured, but the obscured character is clearly detectable in a previous video frame, the confidence level of the OCR performed may be high (e.g., the circuits 102a-102n may use detections from previous video frames to infer results in a later video frame). Similarly, for objects detected, if a vehicle make/model is determined, the confidence level may be high. In another example, if a vehicle looks like another vehicle make/model, the confidence level may be low. In some embodiments, there may be a confidence level for each object and/or each character of each object (e.g., a high granularity of detection). In one example, each license plate that is detected may have a confidence level for each character on the license plate. In another example, each vehicle detected may have a confidence level associated for the color of the vehicle, the year of the vehicle, the make of the vehicle, the model of the vehicle, etc.

License Plate Recognition (LPR) systems may employ Optical Character Recognition (OCR) technology to read individual characters of the license plate tags. The characters may represent a combination of alpha-numeric characters along with any special shapes available by the state and chosen by the individual for vanity plates such as stars, hearts, smiley faces, etc. LPR systems may not be perfect and a variety of factors may cause imperfect scans including dirty, bent, and/or damaged plates or non-ideal capture environments such as rainy, snowy, dark and foggy climate conditions. Similar factors may affect object recognition.

The circuits 102a-102n may be configured to generate the signal OCR_CONF as a confidence level as part of the OCR results to give an idea of the trustworthiness of the information returned. Similarly, the circuits 102a-102n may be configured to generate the signal OBJ_CONF as a confidence level as part of the object detection results to give an idea of the trustworthiness of the information returned. In one example, the confidence level may be provided as a percentage (e.g., 100% confidence, 50% confidence, 25% confidence, etc.). In another example, the confidence level may be provided as a fuzzy logic category (e.g., high confidence, low confidence, no confidence, etc.). In yet another example, the confidence level may be provided as a binary result (e.g., confident or not confident). The type of confidence result provided by the circuits 102a-102n may be varied according to the design criteria of a particular implementation.

The signal IMG may be a data portion of the captured video data. The camera 100a may communicate the signal IMG and the system 50 may transfer the signal IMG to the metadata server 120. The metadata server 120 may be configured to store and/or convert the data portion IMG. In one example, the data portion may be an image (e.g., a JPEG file) and the server 120 may convert text detected in the image to a text format. In another example, the data portion may be an image and the image may be presented to the user devices 112b-112n as part of the signals GAME_A-GAME_N. In yet another example, the data portion may be a video clip.

The signals GAME_A-GAME_N may comprise information used by the gamification aspect of the system. In an example, the signals GAME_A-GAME_N may comprise data portions (e.g., still images, short video clips, text scanned from an image, etc.) of the video data captured by the capture device 100a (e.g., the signals GAME_A-GAME_N may comprise information from the signal IMG). The signals GAME_A-GAME_N may further comprise other information such as a question to the user and/or a number of possible answers. The signals GAME_A-GAME_N may comprise the images and/or video along with the questions about the objects and/or plate (e.g., license plate characters) that has been identified by the circuit 102a that the user may help confirm.

The signals ANSWER_A_ANSWER_N may be the response from the users. The signals ANSWER_A_ANSWER_N may be the human feedback for the object detection and/or character detection results. The signals ANSWER_A_ANSWER_N may be used to help to improve the object and/or license plate character detection. The human feedback may be a second source of data that may be used to determine and/or classify objects along with the video data analysis. Using two disparate sources of data for detecting and/or classifying objects may enable the system 50 to infer results that would otherwise be unable to be determined from either source alone.

The object detection of the circuits 102a-102n may implement OCR for license plates and/or other objects with characters (e.g., street signs, addresses, construction signs, etc.). Similarly, the object detection of the circuits 102a-102n may recognize objects, perform classifications of objects and/or recognize characteristics of objects (e.g., a size, an orientation, a color, a speed, a distance, a direction, etc.). The metadata server 120 and/or the database 130 may send the object detection data as the signals GAME_A-GAME_N to other drivers using the game (e.g., the user devices 112a-112n). In some embodiments, the database may use the information in the user profiles 156 to bias the data portions sent to drivers in the same area. Targeting drivers in the same area may have a dual advantage of encouraging competition with someone more closely identified as a peer and also has the advantage of perhaps asking details of objects that the other driver may have seen during while driving (e.g., objects in a neighborhood or route often used by the user). The users may respond and provide the signals ANSWER_A-ANSWER_N as feedback.

A block (or circuit) 300 is shown on the user device 112a. The block 300 may be a companion application for the system 50. The companion application 300 may comprise a block (or circuit) 302. The block 302 may represent the gamification portion of the companion application 300. While the block 300 and/or the block 302 are shown on the user device 112a, each of the user devices 112a-112n may implement the companion application 300 and/or the gamification portion 302. For example, each of the circuits 102a-102n may implement a memory and a processor configured to store and/or execute computer readable instructions to implement the companion application 300 and/or the gamification portion 302.

The companion application 300 may enable the user to control various aspects of the capture devices 100a-100n (e.g., settings, preferences, power on/off, etc.). The companion application 300 may be configured to edit the corresponding one of the user profiles 170a-170n (e.g., edit personal information, change address, change password, etc.). The companion application 300 may provide a graphical user interface to receive input and/or provide output for the capture devices 100a-100n and/or the database 130.

The gamification portion 302 may be a graphical user interface for receiving the data portions and/or providing the human feedback. The gamification interface 302 may further enable the user to access various gamification features (e.g., scoreboards, leaderboards, accept challenges, etc.). Details of the gamification interface 302 may be explained in association with FIGS. 6-10.

The database 130 is shown comprising a block (or circuit or module) 312, a block (or circuit or module) 314, a block (or circuit or module) 316 and/or a block (or circuit or module) 318. The block 312 may implement a confidence level module. The block 314 may implement a data portions module. The block 316 may implement a feedback and update module. The block 318 may implement a user storage module. The database 130 may comprise other components (not shown). The number, type and/or arrangement of the module 312-318 may be varied according to the design criteria of a particular implementation.

The confidence level module 312 may be configured to store and/or analyze the confidence levels. For example, the confidence levels may be the data received in the signal OCR_CONF and/or the signal OBJ_CONF. The confidence level module 312 may be part of the metadata 158. Which data to request feedback about from the users may be determined based on the confidence levels stored and/or analyzed by the confidence level module 312.

The data portions module 314 may be configured to store and/or generate the data portions. The data portions module 314 may provide temporary storage (e.g., after human feedback is received and the results updated, the data portions may be purged from the data portions module 314). The data portions module 314 may store the data portions received from the signal IMG. The data portion module 314 may be configured to generate the data portions (e.g., intelligently create images similar to previously received images, generate text output from an image based on OCR results, change one character in a license plate scan, etc.). The data portions from the data portions module 314 may be communicated to the user devices 112a-112n as part of the signal GAME_A-GAME_N.

The feedback and update module 316 may be configured to analyze the responses received from the users (e.g., the signals ANSWER_A-ANSWER_N). The feedback and update module 316 may store and/or aggregate the information in the signals ANSWER_A-ANSWER_N. Some of the feedback may be discarded (e.g., outlier answers). The feedback and update module 316 may be configured to apply weighting (e.g., statistical significance) to the answers based on the user that provided the feedback (e.g., trusted users may have more statistical weight than untrusted users). The feedback and update module 316 may be configured to interpret the feedback and provide updates to the object and/or character detection analysis performed. In some embodiments, the database 130 may provide the update determined by the feedback and update module 316 to each of the circuits 102a-102n to improve the object/character recognition performed. In some embodiments, the database 130 may provide the results to the circuits 102a-102n to enable the circuits 102a-102n to use the information to make inferences in real-time. For example, the update may provide the correct result for an unknown character in a license plate, and the circuits 102a-102n may use the correct result when analyzing the same license plate (e.g., when following a vehicle). The feedback and update module 316 may be configured to backfill video analysis results (e.g., correct errors and/or fill in missing information) based on the human feedback received.

The user storage module 318 may be configured to store gamification statistics about each user. The user storage module 318 may store a total amount of feedback answers provided by a particular user. The user storage module 318 may store a response time for a particular user. The user storage module 318 may be used to determine a trust rating for a particular user (e.g., whether a user consistently provides feedback that is similar to the majority of the feedback). The user storage module 318 may be used to blacklist a particular user with a low trust rating (e.g., a particular user may be determined to be intentionally trolling the system by providing incorrect feedback). The user storage module 318 may be configured to determine the amount of statistical weight to provide to the responses of each user. The user storage module 318 may be configured to generate leaderboards and/or compile rankings for the users to encourage friendly competition. The user storage module 318 may be configured to update and/or store information in the user profiles 170a-170n.

Figure 6:
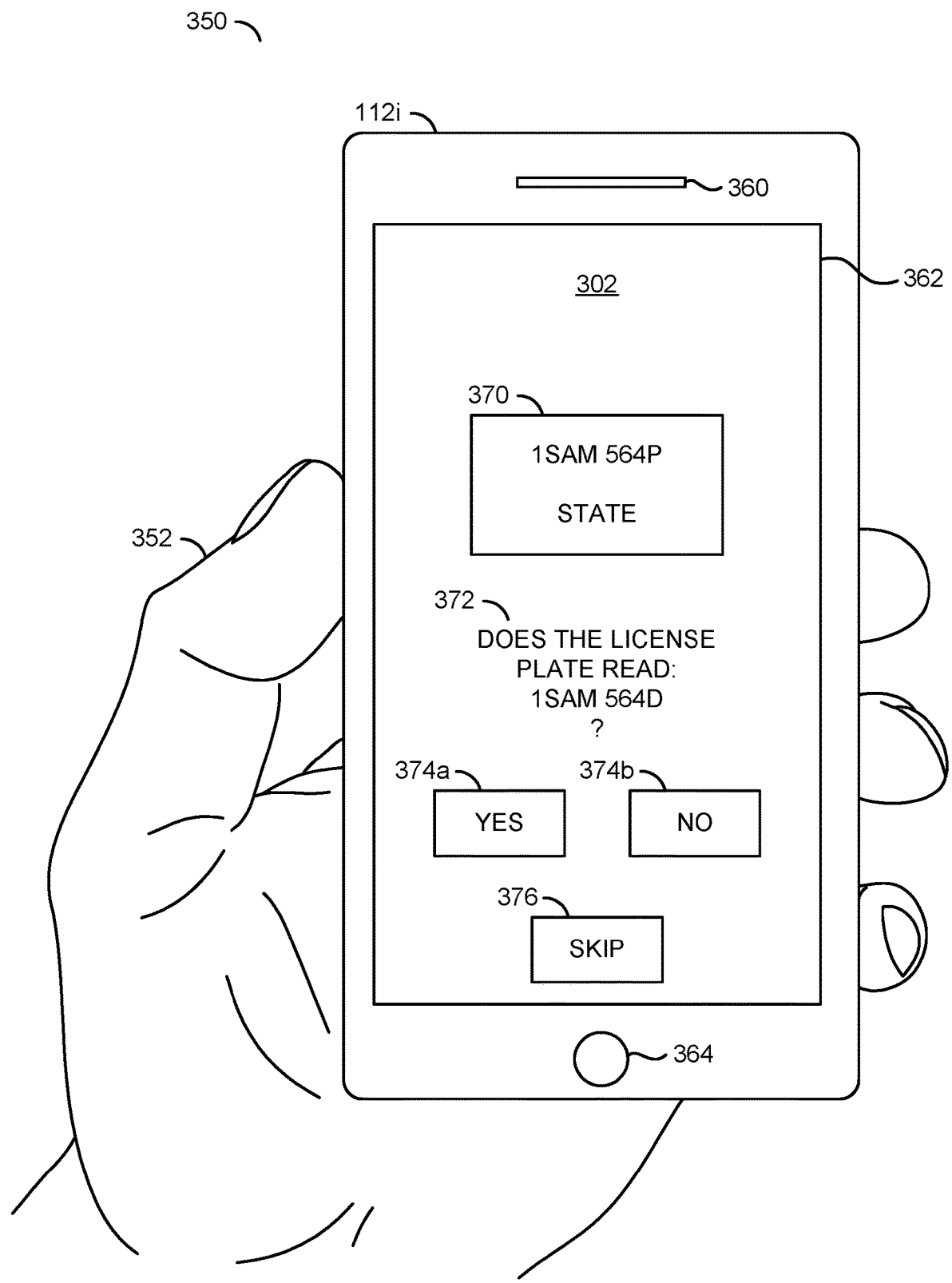
FIG. 6 is a diagram illustrating an example embodiment of a gamification app.

Referring to FIG. 6, a diagram illustrating an example embodiment 350 of a gamification app is shown. One of the user devices 112i is shown. A user 352 is shown holding the user device 112i. The user device 112i is shown implementing a speaker 360, a touchscreen interface 362 and/or a microphone 364. The user device 112i may comprise other components (not shown). For example, the user device 112i may comprise a processor and/or a memory. In the example shown, the user device 112i is a smartphone. In some embodiments, the user device 112i may be implemented as a tablet computing device, a desktop computer, a laptop computer, a smart watch, etc. Generally, the user device 112i may be implemented as a portable computing device that implements the touchscreen display 362 (or other user I/O) and a networking capability to connect to the database 130 (e.g., via the internet 60) and the capture device 100i. In some embodiments, the connection may be wireless and/or a wired connection. For example, a Bluetooth connection may be implemented to connect the user device 112i to the capture device and a Wi-Fi (or cellular such as 3G/4G/LTE/5G) connection may be implemented to connect the user device 112i to the database 130.

Generally, an implementation with a smartphone as the user device 112i may provide sufficient communication and/or display functionality (e.g., smartphone displays may have a high resolution to enable the user to view the objects and provide feedback). As smart watch technology improves (e.g., enables wide area wireless communication), the companion application 300 may be usable on a smart watch. The smart watch may be capable of displaying an image such as a license plate and/or a vehicle and the smart watch may provide a yes/no prompt to enable feedback from the user 352.

The touchscreen interface 362 is shown displaying an example of the gamification interface 302. The example gamification interface 302 may comprise a data portion 370, instructions 372, feedback 374a-374b and a skip option 376. In the example shown, the gamification interface 302 may be a basic app display that asks the user 352 to confirm the scanned license plate. For example, one type of feedback (e.g., the signal ANSWER_A-ANSWER_N) may be a binary response. The companion application 300 may prevent the display of the gamification interface 302 while driving. For example, the user 352 may be determined to be driving based on movement along the roadway being detected by the video analysis of the capture devices 100a-100n.

In some embodiments, the gamification interface 302 may be generated in response to one or more of the signals GAME_A-GAME_N. In an example, each of the signals GAME_A-GAME_N may comprise the data portion 370, the instructions 372 and/or other data. For example, the other data may provide information such as the type of feedback 374a-374b requested. In the example shown, the signals GAME_A-GAME_N may indicate a binary type of feedback is requested.

The companion application 300 and/or the gamification interface 302 may comprise style information. The style information may be implemented to apply visual effects and/or a layout for the information received in the signals GAME_A-GAME_N. Generally, the style information may be configured to provide a visually pleasing and/or intuitive design for presenting data to and/or receiving information from the user 352. The layout and/or style of the data portion 370, the instructions 372, the feedback 374a-374b and/or the skip option 376 shown may be a representative example. Generally, the gamification interface 302 may be implemented using a responsive and/or adaptive design configured to conform to the viewport of the user device 112i (e.g., a different layout for a smartphone compared to a smart watch). The layout and/or style of the companion application 300 and/or the gamification interface 302 may be varied according to the design criteria of a particular implementation.

In the example shown, the data portion 370 may be an image of a license plate. The data portion 370 may generally comprise the subject of the object detection and/or character recognition. In one example, the capture device 100a may present the signal IMG to the database 130. The signal IMG may comprise a still image generated from the captured video data. The capture device 100a may present the signal OCR_META comprising a result of optical character recognition performed by the circuit 102a. For example, the result of the optical character recognition may be '1SAM 564P'. The capture device 100a may present the signal OCR_CONF comprising a confidence level of the result of the optical character recognition. In the example, the confidence level of the '1SAM 564P' may be a low confidence result (e.g., an optical character recognition result of '1SAM 564D' may have a similar confidence level and the human feedback may be requested to help distinguish between the two potential results). Since the confidence level is low, the database 130 may request feedback from the user 352.

The database 130 (e.g., using one or more of the modules 312-318) may generate the signals GAME_A-GAME_N. For example, the data portions module 312 may convert the signal IMG into a format readable by the gamification interface 302 to generate the data portion 370. In another example, the feedback and update module 314 may generate the instructions 372 and/or the type of feedback 374a-374b. The type of feedback, instructions and/or presentation of the data portion 370 may be generated based on the signal IMG, the type of detection (e.g., OCR metadata from the signal OCR_META or object detection metadata from the signal OBJ_META) and/or the confidence level (e.g., the signal OCR_CONF and/or the signal OBJ_CONF). For example, a binary response may be suitable for a relatively high confidence level of a license plate OCR scan (e.g., one character of a license plate is uncertain). Other types of feedback (e.g., multiple choice, free-form text, etc.) may be suitable for types of objects and/or confidence levels.

The user device 112i may receive one of the signals GAME_A-GAME_N (e.g., GAME_I). The companion application 300 and/or the gamification interface 302 may interpret the signal GAME_I and generate the data portion 370, the instructions 372, the feedback 374a-374b and/or the skip option 376. The instructions 372 may provide a request for feedback. The user 352 may interact with the gamification interface 302 to provide a human feedback response. In the example shown, the user 352 may press the button 374a, the button 374b or the button 376 to respond. In response to the user 352 pressing one of the buttons 374a-374b and/or the button 376 (additional confirmation interfaces may also be included to prevent accidental or unintentional responses), the user device 112i may generate one of the signals ANSWER_A-ANSWER_N (e.g., ANSWER_I).

The signal ANSWER_I may comprise the feedback 374a-374b. In the example shown, the data portion 370 may comprise the license plate characters '1SAM 564P' and the instructions 372 may ask the user 352 to confirm if the license plate characters read '1SAM 564D' (e.g., an alternate potential result). The user 352 may confirm that the license plate characters read '1SAM 564D' by pressing the button 374a. The signal ANSWER_I may present the affirmative response to the database 130. The feedback and update module 316 may aggregate the response from the user device 112i with responses received from the other user devices 112a-112n. Based on the aggregated responses ANSWER_A-ANSWER_N, the feedback and update module 316 may update the information in the metadata 158. For example, the aggregated responses may indicate that the original result from the camera 100a was correct and no update may be needed and/or positive feedback may be provided to the camera 100a. In another example, the aggregated response may indicate that the original result from the camera 100a was incorrect and the metadata 158 may be updated to the corrected information and/or negative feedback may be provided to the camera 100a. The responses to the aggregated feedback may be varied according to the design criteria of a particular implementation.

The signal ANSWER_I may comprise the skip option 376. The skip option 376 may provide the user 352 with an opportunity to decline to give a response. For example, if the user 352 is not able to accurately read the data portion 370, the user may select the skip option 376 to avoid guessing or accidentally providing an incorrect answer. Since the user storage module 318 may provide a score and/or trust level for the user 352, selecting the skip option 376 may enable the user 352 to decline to provide an answer and risk being penalized.

In some embodiments, the gamification interface 302 may provide a second, similar query. For example, a first query may provide the instructions 372 having the text, "Does the license plate read 1SAM 564D". If the user 352 selects the "NO" feedback option 374b, a second query may be provided on the gamification interface 302 that provides the instructions 372 having the text, "Does the license plate read 1SAM 564P". The signals GAME_A-GAME_N may comprise a sequence of queries. For example, the sequence of queries may be presented in an order based on the confidence level of the OCR and/or object detection. In the example shown, the highest confidence level result may be presented first with '1SAM 564D' (e.g., an incorrect result) and a next highest confidence level result may be presented second with '1SAM 564P' (e.g., a correct result). Asking multiple queries in a sequence may provide more human feedback to improve video analysis detection results by the circuits 102a-102n.

In the example shown, the data portion 370 may be an image of a license plate (e.g., to request feedback for an OCR result). In some embodiments, the data portion 370 may be an image of an object (e.g., a vehicle, a traffic light, a roadway sign, a building, a location, a landmark, a pedestrian, etc.). In the example shown, the instructions 372 may request that the user 352 confirm a result of the object detection performed by the capture device 100a. In some embodiments, for an object, the instructions 372 may ask the user 352 to confirm a color, size and/or shape of an object. In some embodiments, for an object, the instructions 372 may ask the user 352 to confirm a make, model and/or year of a vehicle. In some embodiments, for an object, the instructions 372 may ask the user 352 to confirm a status of an object (e.g., which color is the traffic light, what type of sign is displayed, which vehicle/pedestrian has the right of way at an intersection, etc.). The type of queries for the user 352 may be provided based on the type of data received from the capture devices 100a-100n and/or the scenarios detected. While an OCR query is shown as the example embodiment 350, the type of query may be varied according to the design criteria of a particular implementation.

In the example embodiment 350, the gamification interface 302 may utilize the feedback 374a-374b from the user 352 about license plate data. The user 352 may be asked if the characters were read (e.g., scanned using OCR) correctly. In an example, an image of a license plate may be presented (e.g., the data portion 370) with a question as the instructions 372 (e.g., does the license plate read: "1SAM 564D"?). The user 352 may have the option of pressing a bullet (or icon) to provide feedback. For example, one icon 374a may be provided beside the word "YES" or a bullet icon 374b beside the word "NO". If the user 352 chooses the NO option 374b, a dialog box may be displayed and the touchscreen keyboard may be opened. The dialog may read something like "Please enter the license plate characters here" and provide the user 352 the option to type in the correct answer.

Generally, the signals GAME_A-GAME_N may provide the data portion 370 and/or the instructions 372 that correspond to a result from the capture devices 100a-100n (e.g., a result from video analytics). In some embodiments, the signals GAME_A-GAME_N may provide the data portion 370 and/or the instructions 372 that correspond to a known result. In one example the signals GAME_A-GAME_N may be an audit of a high confidence result. In another example the signals GAME_A-GAME_N may be generated by the database 130 and may not be based on detected data from the capture devices 100a-100n. For example, the database 130 may randomly generate characters and present the randomly generated characters to the user 352 as if the randomly generated characters were from object detection. The randomly generated characters may be provided as a test case to determine whether the user 352 is providing honest answers. For example, if the user 352 provides an incorrect result to the randomly generated characters, the database 130 may reduce a trust rating for the user 352.

The user 352 may be a driver of the vehicle 200 implementing one of the capture devices 100a-100n. In some embodiments, the user 352 may be another participant of the system 50. For example, the companion application 300 and/or the gamification interface 302 may be implemented using one of the subscriber devices 100a-100n. In one example, if the user 352 is a subscriber that pays a fee for requesting the video data, one perk for participating in the human feedback using the gamification interface may be receiving a discount on the fee for requesting the video data.

Figure 7:
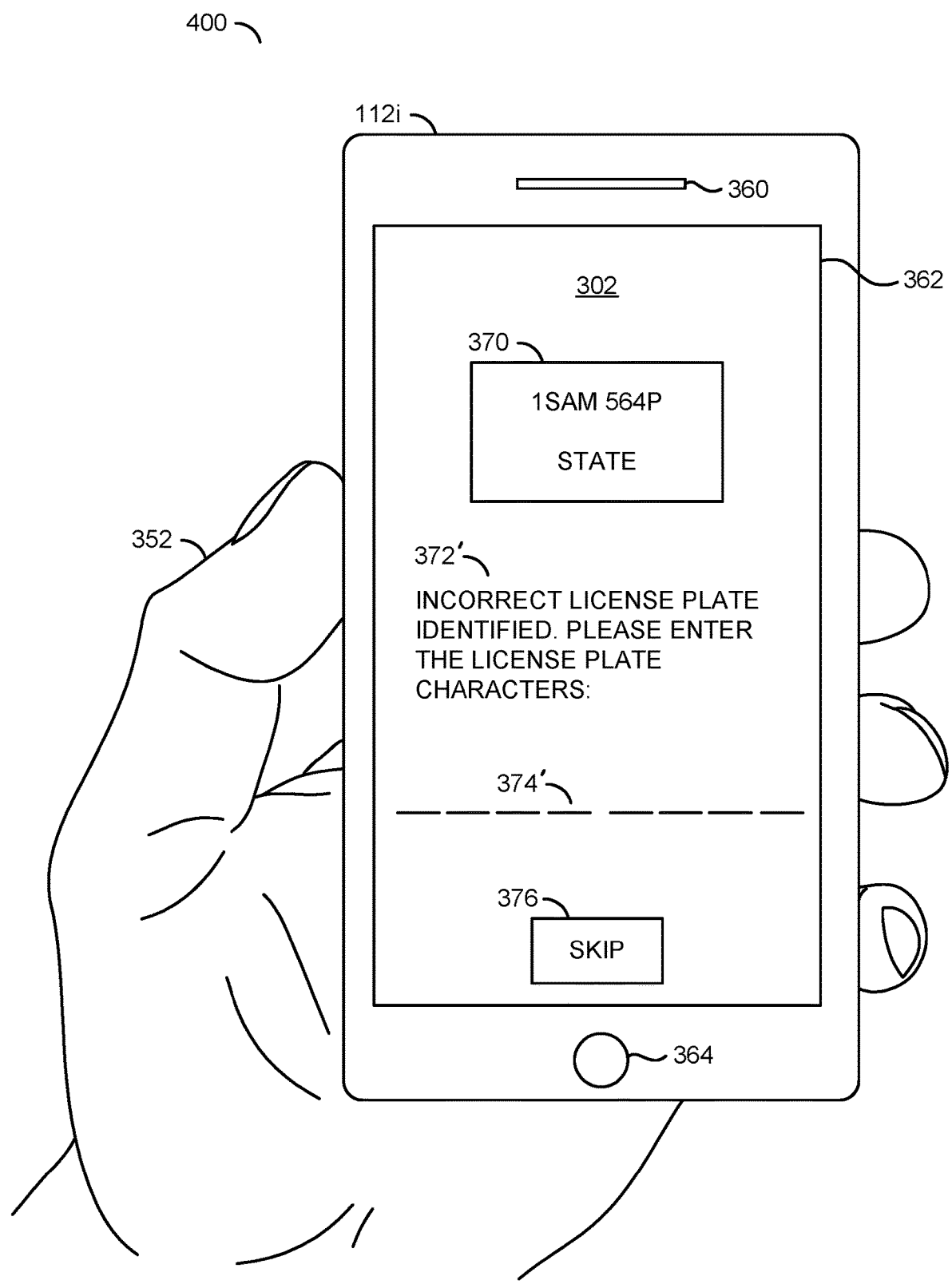
FIG. 7 is a diagram illustrating an alternate example embodiment of a gamification app.

Referring to FIG. 7, a diagram illustrating an alternate example embodiment 400 of a gamification app is shown. The example embodiment 400 may be similar to the example embodiment 350 shown in association with FIG. 6. For example, the user 352 is shown holding the smartphone 112i. The smartphone 112i is shown having the speaker 360, the touchscreen display 362 and the microphone 364. The gamification interface 302 is shown displayed on the touchscreen display 362.

The example embodiment 400 may be an example of the gamification interface 302 presented to the user 352 after the user has selected the "NO" feedback option 374b (as shown in the example embodiment 350 in association with FIG. 6). The gamification interface 302 may enable the user 352 to type in a correction. For example, the companion application 300 may be user friendly and only ask the user 352 to change the incorrect characters. For example, there may be instructions to 'touch and change the characters that are incorrect'.

In the example embodiment 400, the gamification interface 302 may continue to display the same data portion 370 (e.g., to provide a reference for the user 352 to make the correction). The instructions 372' may instruct the user 352 to enter the correct license plate characters. The feedback 374' may be a blank line (or blank text field) to enable the user to type in information. For example, when the user device 112i is a smartphone, tapping the feedback line 374' may pull up the onscreen keyboard to allow the user 352 to type input.

The feedback 374' may be communicated to the database 130 as one of the signals ANSWER_A-ANSWER_N (e.g., the signal ANSWER_I). The signal ANSWER_I may comprise the corrected license plate characters from the user 352. The feedback and update module 316 may use the feedback 374' to update the metadata 158 and/or improve future character recognition and/or object detection.

In the example shown, the example embodiment 400 may provide the blank line for text input 374' in response to the user 352 first selecting the 'NO' box 374b on a prior screen. However, in some embodiments, the blank line for text input 374' may be provided for initial queries. Other examples for the data portion 370 could include a make, a model, and a color of a vehicle using similar techniques as above (e.g., displaying one or more photos of the vehicle or even short video clips and asking for human input). Similarly, other roadway objects could be identified like street lights with state (e.g., green, yellow, red, advanced green, arrow, etc.), street signs, food vendor carts, construction events, pedestrian details (e.g., group or individual), baby carriages, shopping carts, potholes, graffiti, etc. In another example, the blank for text input 374' may be used for feedback for detecting street names on street signs.

The skip option 376 may also be provided on the gamification interface 302 in the example embodiment 400. The skip option 376 may be used by the user 352 if the user 352 does not want to take the time to enter the corrected license plate characters. In some embodiments, the gamification interface 302 may provide an option to defer entering the correction (e.g., the user 352 may want to provide the feedback 374' when on a desktop computer using a physical keyboard). In some embodiments, if the user 352 selects the skip option 376 instead of providing the correction feedback 374', the feedback and update module 316 may reduce a weight (e.g., confidence) of the human feedback provided by the user 352 for the particular response. The database 130 may further adjust how the query is presented to other users in order to encourage other users to provide the correct result.

In an example, if the user 352 selects the skip option 376, one of the adjustments to the query to be presented to other users may be to split the license plate string into individual characters. For example, the data portion module 312 may divide the signal IMG into individual characters and the signals GAME_A-GAME_N may each comprise one character from the license plate. The gamification interface 302 may provide an embodiment similar to the example embodiment 350 shown in association with FIG. 6 with the instructions 372 asking about the individual characters and the users may provide "YES" or "NO" responses as feedback using the feedback buttons 374a-374b. If the "NO" feedback 374b is selected for the individual character, the gamification interface 302 may provide a query similar to the example embodiment 400 with the feedback line 374' asking the users to manually type in the single character (e.g., which may be easier on a smartphone software keyboard than typing in an entire word and/or license plate string). In another example, if the "NO" feedback 374b is selected for the individual character, the gamification interface 302 may provide a multiple choice query. Details of the multiple choice query may be described in association with FIG. 8. For example, if the incorrect character is a "D" the multiple choice query may provide options for characters that may often be mistaken for a "D" (e.g., a "Q", a "P", an "O", a "C", a "B", etc.). Generally, the multiple choice query may not provide options for a character that does not resemble the mistaken character (e.g., a "W" may not be selected as an option for the letter "D").

Figure 8:
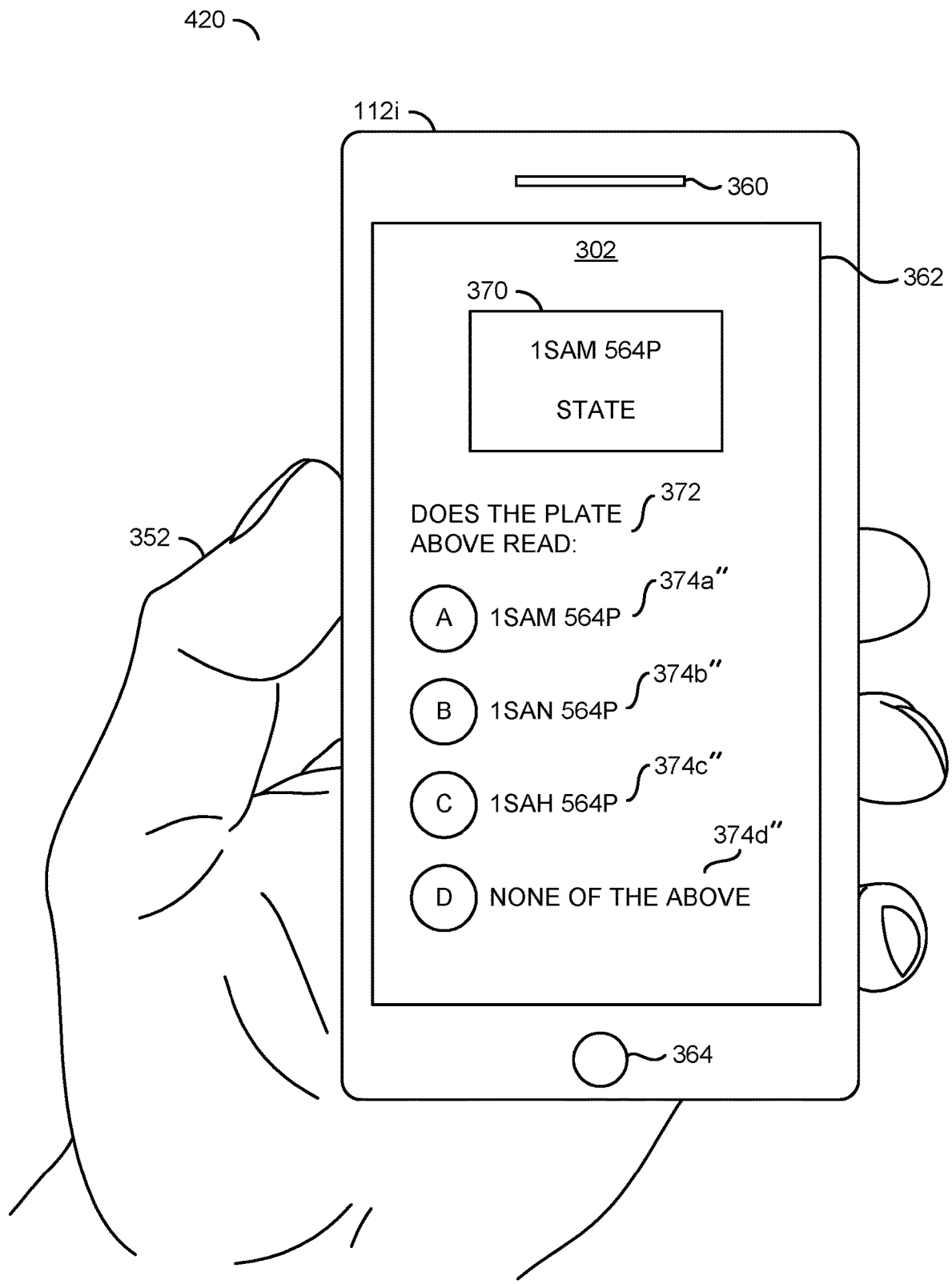
FIG. 8 is a diagram illustrating an example multiple choice embodiment of a gamification app.

Referring to FIG. 8, a diagram illustrating an example multiple choice embodiment 420 of a gamification app is shown. The example embodiment 420 may be similar to the example embodiment 350 shown in association with FIG. 6. For example, the user 352 is shown holding the smartphone 112i. The smartphone 112i is shown having the speaker 360, the touchscreen display 362 and the microphone 364. The gamification interface 302 is shown displayed on the touchscreen display 362.

In the example embodiment 420, the gamification interface 302 may display a multiple choice question. In the example shown, the data portion 370 may be the example image of a license plate. The instructions 372 may inform the user 352 to select which of the multiple choice answers is correct. The feedback choices 374a''-374d'' may be multiple choice selections. Similarly, the gamification interface 302 may provide the skip option 376 for the multiple choice query (not shown). The one of the feedback choices 374a''-374d'' that is selected by the user 352 may be provided to the database 130 as one of the signals ANSWER_A-ANSWER_N. The feedback may be aggregated by the feedback and update module 316.

In some embodiments, there may be a series of low confidence results captured by the capture device 100a over a short time interval that may be combined to form a higher confidence level result that may be applied to all occurrences. For example, there may be a result where a general confidence that the same plate has been scanned multiple times over a short time period but one of the characters still has a low confidence score. The companion application 300 may display several of the images (e.g., from several different scans) of the license plate as the data portion 370. The instructions 372 may give the user 352 a multiple choice question.

In the example shown, the data portion 370 may comprise the characters '1SAM 564P'. The multiple choice feedback response 374a" may be '1SAM 564P' (e.g., the correct answer). The multiple choice response 374b" may be '1SAN 564P' (e.g., an incorrect response). The multiple choice response 374c" may be '1SAH 564P' (e.g., an incorrect response). The multiple choice response 374d" may be a none of the above response.

In the example shown, the 4th character may have a low confidence result (e.g., may be an M, an N or an H). For example, the database 130 may provide the multiple choice options as part of the signals GAME_A-GAME_N based on the 3 highest confidence results. For example, the circuit 102a may have provided the signal OCR_META with three possibilities for the 4th character (e.g., M, N, or H) and provided the signal OCR_CONF with confidence levels for each of the possibilities (e.g., 30% for H, 22% for N and 15% for H). In some embodiments, the database 130 may select the various multiple choice responses 374a"-374d" randomly and/or based on prior knowledge of characters and/or objects that look similar (e.g., an M and N may be known to often be difficult for OCR to tell apart).

If the 'none of the above' option 374d" is chosen, the gamification interface 302 may provide an onscreen keyboard that would open with a dialog asking the user 352 to enter the correct answer for the data portion 370. The user 352 may be prompted to type (or speak) the correct result similar to the example embodiment 400 shown in association with FIG. 7. In some embodiments, the companion application 300 may provide speech-to-text conversion to enable the user 352 to speak the correct result and convert the speech to a format readable by the database 130 as one of the signals ANSWER_A-ANSWER_N.

Figure 9:
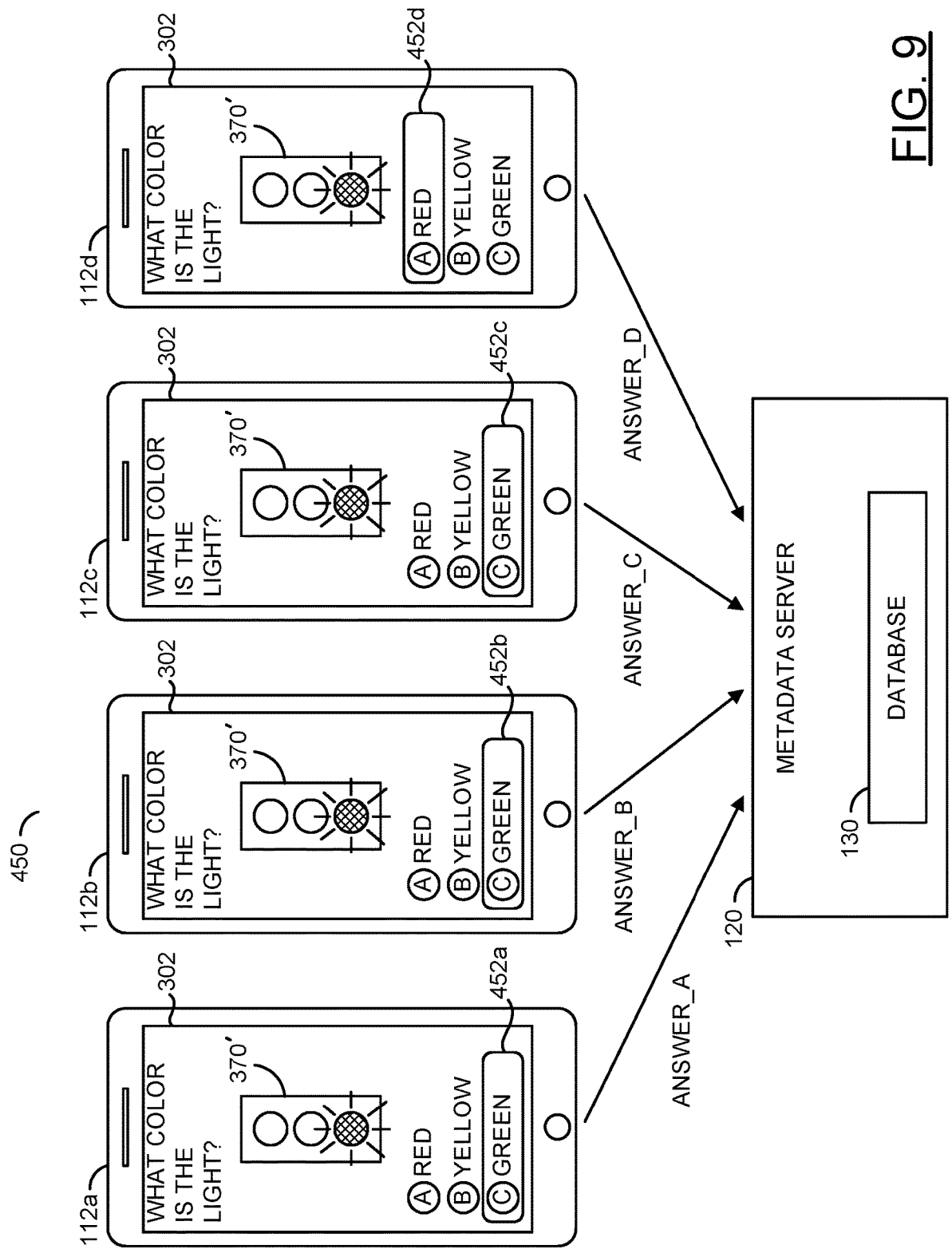
FIG. 9 is a diagram illustrating receiving feedback from multiple users.

Referring to FIG. 9, a diagram illustrating receiving feedback from multiple users is shown. An example feedback scenario 450 is shown. The example feedback scenario 450 may comprise a number of the user devices 112a-112d providing feedback to the database 130 via the signals ANSWER_A-ANSWER_D. While four of the user devices 112a-112d are shown, any number of the user devices 112a-112n may provide the feedback ANSWER_A-ANSWER_N to the database 130.

In the example feedback scenario 450, each of the smartphones 112a-112d are shown displaying the gamification interface 302. The gamification interface 302 on each of the smartphones 112a-112d may comprise the data portion 370'. The data portion 370' may be an image of a traffic light having an illuminated green light. The gamification interface 302 may comprise a multiple choice question to receive human feedback about what color light is illuminated on the traffic light 370'.

User selections 452a-452d are shown as feedback from the users that selects one of the multiple choice options. The user selection 452a is shown as green (e.g., the correct answer). The user selection 452b is shown as green (e.g., the correct answer). The user selection 452c is shown as green (e.g., the correct answer). The user selection 452d is shown as red (e.g., an incorrect answer). The user selections 452a-452d may be the human feedback provided to the database 130 using the signals ANSWER_A-ANSWER_D.

The example feedback scenario 450 may show the database 130 collecting feedback data from multiple users using the same image (e.g., the data portion 370') as a question. The first three users answer correctly (e.g., the user selections 452a-452c), which would improve the confidence level if the object detection detected a green light. In some embodiments, the feedback may be aggregated (e.g., 3 green answers and 1 red answer might indicate high confidence feedback, but not as high as 4 green answers). In some embodiments, the feedback may be weighted first based on a trust score and then aggregated (e.g., the first user might have a trust score of 1.0, the second user might have a trust score of 0.5, the third user might have a trust score of 0.3 and the fourth user might have a trust score of 0, indicating a feedback of 1.8 for green and 0 for red).

In some embodiments, the fourth user might be a 'troll' that intentionally answers incorrectly (e.g., the user selection 452d). If a user often answers incorrectly, the 'trust level' for that user will be reduced and the answers of the untrusted user will have less weight. A user may be suspended or banned (e.g., penalized) for intentionally providing incorrect answers. The user storage module 318 may store statistical information about user responses. For example, the user storage module 318 may store information for determining how often a particular user answers incorrectly (e.g., the answer is an outlier based on the majority of answers provided). The trust level for the user in the user storage module 318 may be reduced and/or the user account may be marked as suspended (e.g., temporarily), or banned (e.g., permanently). The trust level may be important if there is some sort of financial incentive or reward for answering many questions.

Figure 10:
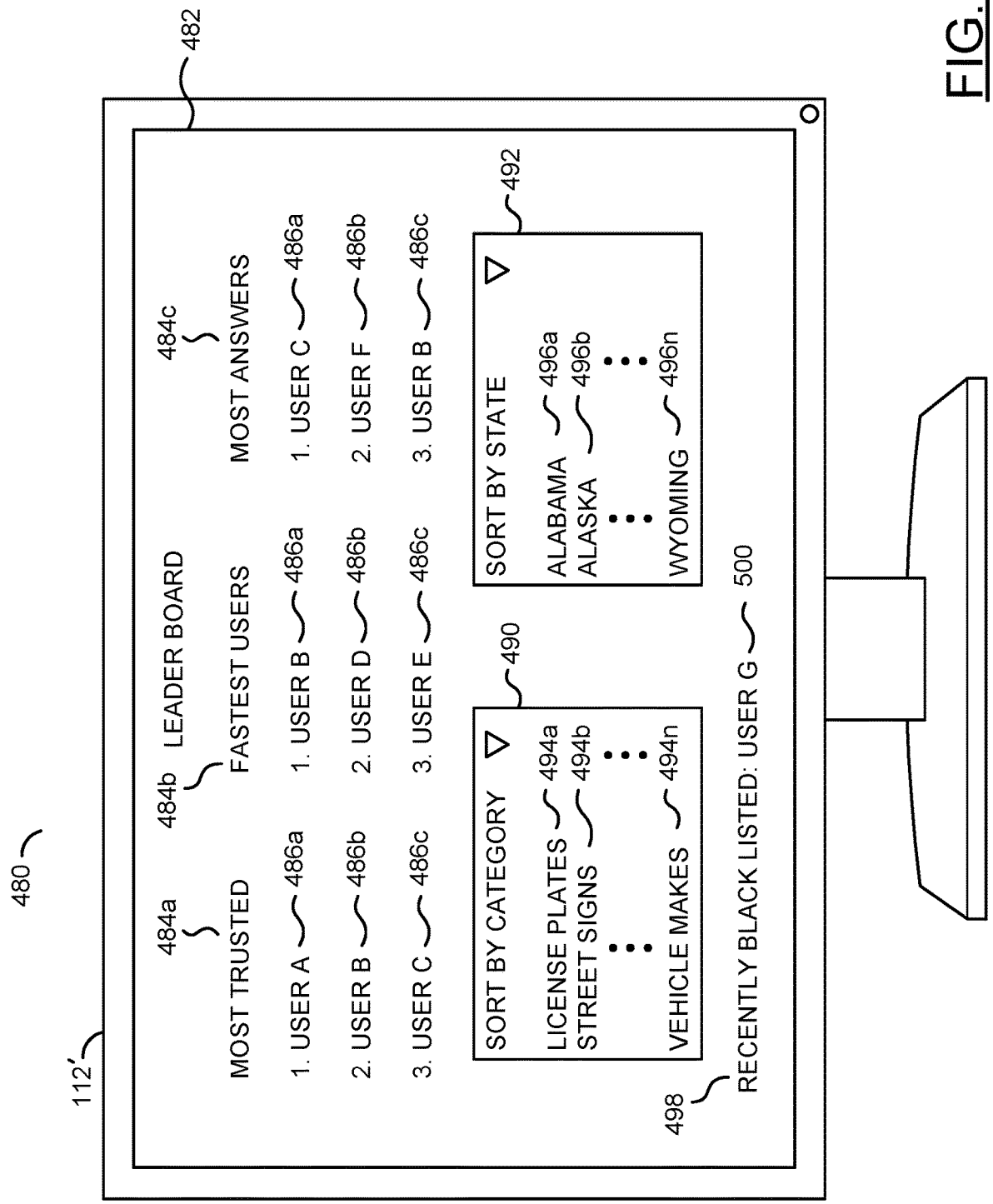
FIG. 10 is a diagram illustrating an example scoreboard portion of a gamification app.

Referring to FIG. 10, a diagram illustrating an example scoreboard portion 480 of a gamification app is shown. In the example scoreboard portion 480, the user device 112' is shown as a desktop computer monitor. A leaderboard (or scoreboard) 482 is shown displayed on the user device 112'. The leaderboard 482 may be a portion (or subsection) of the gamification interface 302 available in the companion application 300.

The leaderboard 482 may comprise one or more lists of users 484a-484c. The lists of users 484a-484c may be user rankings for various categories. In the example shown, the list of users 484a may be a list of most trusted users (e.g., based on the trust level of the user for users that answer correctly), the list of users 484b may be a list of fastest users (e.g., users that respond to queries in the shortest amount of time), and the list of users 484c may be a list of users with the most answers (e.g., users that do the most work by answering the highest number of queries). The lists of users 484a-484c may be determined based on information in the user storage module 318. The types and/or number of lists of users 484a-484c may be varied according to the design criteria of a particular implementation.

Each of the list of users 484a-484c are shown comprising ranked users 486a-486c. In the example shown, for the most trusted list of users 484a, user A may be the first ranked user 486a (e.g., the most trusted user), user B may be the second ranked user 486b (e.g., the second most trusted user) and user C may be the third ranked user 486c (e.g., the third most trusted user). Each of the list of users 484a-484c may have a different order of ranked users 486a-486c. For example, for the fastest users list 484*b*, user B may be the first ranked user 486*a* (e.g., the fastest user), user D may be the second ranked user 486*b* (e.g., the second fastest user) and user E may be the third ranked user 486*c* (e.g., the fastest user). In the example shown, three users are listed (e.g., the list of users 484*a*-484*c* may be a preview showing the top 3 and a link may be provided to a full list). The number of ranked users 486*a*-486*n* for each of the lists of users 484*a*-484*c* may be varied according to the design criteria of a particular implementation.

A category filter 490 and a location filter 492 are shown as part of the leaderboard 482. The category filter 490 may comprise a list of categories 494*a*-494*n*. The location filter 492 may comprise a list of locations 496*a*-496*n*. The category filter 490 and/or the location filter 492 may provide options for narrowing (e.g., filtering) the various lists of users 484*a*-484*c*. For example, selecting the license plates category 494*a* in the category filter 490 may cause the lists of users 484*a*-484*c* to be updated to show the ranked users 486*a*-486*c* for the license plate category (e.g., the list of users 484*a* may be filtered to show the most trusted users for providing feedback on license plate data portions without taking into account the other categories). Similarly, selecting the location 496*b* may in the location filter 492 may cause the lists of users 484*a*-484*c* to be updated to show the ranked users 486*a*-486*c* that are located in the state of Alaska (e.g., the list of users 484*a* may be filtered to show the most trusted users that are located in Alaska but not other areas of the world).

The filtering from the category filter 490 and the location filter 492 may be combined (e.g., selecting the category 494*b* and the location 496*n* may filter the users list 484*b* to show the fastest users for providing feedback on street signs in the state of Wyoming). Each combination of filtering may have different leaders and/or rankings. The number and/or types of available filters may be varied according to the design criteria of a particular implementation.

A blacklisted list 498 is shown on the leaderboard 482. The blacklisted list 498 may be a list of users that have been suspended and/or banned. In the example, a blacklisted user 500 (e.g., user G) is shown. Users may be suspended and/or banned for intentionally providing incorrect feedback (e.g., trolling). The user storage module 318 may be used to determine which users are intentionally providing incorrect feedback. For example, USER G might be banned because the smartphone 112*d* that responded 'red light' (e.g., in the example scenario 450 shown in association with FIG. 9) is associated with the USER G. In some embodiments, the blacklisted user 500 may be temporarily timed out (e.g., the user may not use the game) while the system determines whether the user is knowingly giving false answers. The amount of incorrect feedback that triggers adding a user to the blacklisted list 498 may be varied according to the design criteria of a particular implementation.

In some embodiments, the feedback and update module 316 may propagate the human feedback results through the database 130 and update previous incorrect results or lower confidence results already in the database 130. For example, the capture device 100*a* may perform the video analysis to detect license plate characters on a truck with a ball hitch (e.g., there may be a number of high confidence characters detected, except for the one number hidden behind the hitch). A few different scans (e.g., the signal IMG) of the plate may be sent out using the signals GAME_A-GAME_N to provide the image of the truck plate as the data portion 370. The human feedback ANSWER_A-ANSWER_N may definitively (or at least with very much increased confidence) enable the feedback and update module 316 to come to a conclusion as to the identity of the obscured character. When enough confidence is gained from the aggregated human feedback, the metadata 158 that is associated with the entry may be updated. The association may rely on the idea that a high confidence that the plate could be mapped to a vehicle based on spatial and/or temporal cues.

The user 352 may be rewarded for participation by comparing scores with other drivers (e.g., users) in the system using the leaderboard 482. The scores may be accumulated by total number of objects identified or validated and/or by speed of identification or validation. The leaderboard 482 may enable the users to be rated and/or provide designations per locality (e.g., city, state, zip code, etc.). For example, achievements and/or awards may be provided based on the score of the user. The users may optionally choose what type of objects to identify and validate and become "experts" in a particular realm of object identification. For example, a user named Joe Blow from San Francisco 94122 zip code may compete to be awarded the 'Speed King of Street Sign Identification of San Francisco' with 5433 points and speed rating of 9/10.

Participation in the program may also yield perks such as financial kickbacks based on the human feedback provided. In one example, a user may reap rewards of 1 cent per identification and/or other reward schemes. The revenue kickbacks may be provided to the users in the form of 'micropayments' (e.g., a rate of something like $0.05 per hour). A user that provides a lot of feedback may earn about $100 a year in addition to the titles awarded on the leaderboard 482. Perks may additionally be awarded as a result of using the gamification portion 302 of the companion application 300. In one example, being a reigning champion of one of the categories may result in the database 130 offering a perk such as an increase in the hourly rate for using the capture device 100*a* (e.g., earning 10% more per hour). In another example, a regular jackpot for sustained play and good results may be offered (e.g., $5-$500 awarded periodically to different users based on the rankings on the leaderboard 482). The types of rewards provided may be varied according to the design criteria of a particular implementation.

Figure 11:
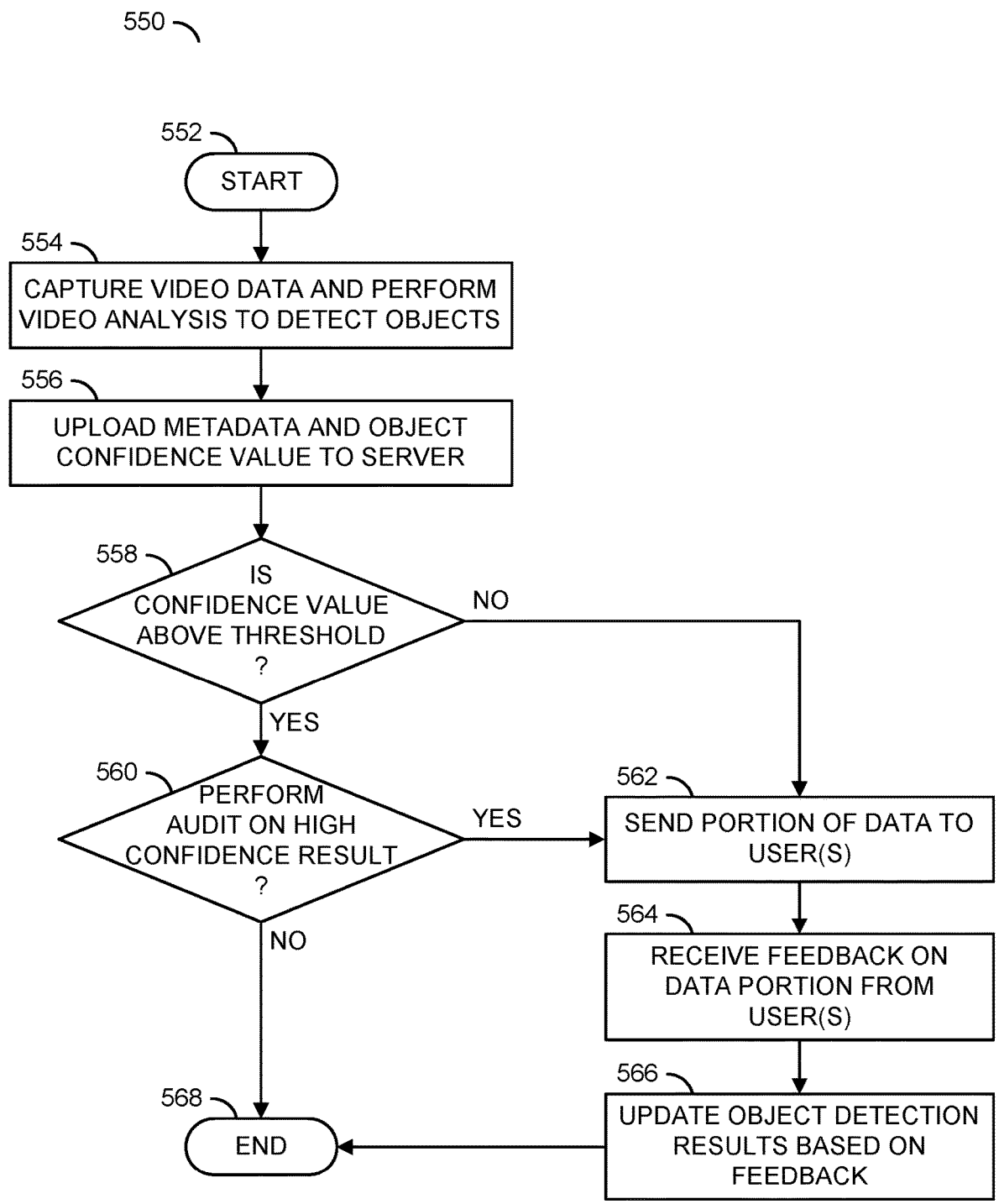
FIG. 11 is a flow diagram illustrating a method for receiving updated object detection results in response to user feedback.

Referring to FIG. 11, a method (or process) 550 is shown. The method 550 may receive updated object detection results in response to user feedback. The method 550 generally comprises a step (or state) 552, a step (or state) 554, a step (or state) 556, a decision step (or state) 558, a decision step (or state) 560, a step (or state) 562, a step (or state) 564, a step (or state) 566, and a step (or state) 568.

The step 552 may start the method 550. In the step 554, the capture devices 100*a*-100*n* may capture video data and/or perform video analysis to detect objects (e.g., using the components of the circuits 102*a*-102*n*). Next, in the step 556, the capture devices 100*a*-100*n* may generate and/or upload metadata (e.g., the signal OCR_META and/or the signal OBJ_META) and/or confidence values (e.g., the signal OCR_CONF and/or the signal OBJ_CONF) to the metadata server 120 via the user devices 112*a*-112*n*. Next, the method 550 may move to the decision step 558.

In the decision step 558, the database 130 may determine whether the confidence level for the object detection and/or character recognition is above a threshold. The confidence level module 312 may determine whether the confidence level of the detection is above the threshold value. In an example, the confidence level may be a percentage (e.g., above 50%) and/or fuzzy logic (e.g., a low confidence level). The threshold value may be varied according to the type of recognition (e.g., the threshold value may be higher for detecting character than for detecting an object). The confidence level module 312 may determine the threshold value. If the confidence level is not above the threshold value, the method 550 may move to the step 562. If the confidence level is above the threshold value, then the method 550 may move to the decision step 560.

In the decision step 560, the database 130 may determine whether to perform an audit on a high confidence result. For example, the audit may be implemented to periodically and/or randomly check a high confidence result as a form of double-check. The confidence level module 312 may determine when to perform the audit. If no audit is to be performed, the method 550 may move to the step 568. If the audit is to be performed, the method 550 may move to the step 562.

In the step 562, the data portion module 314 may send a portion of the received data (e.g., from the signal IMG) to the users (e.g., as the signal GAME_A-GAME_N and displayed on the user devices 112a-112n as the data portion 370 in the gamification interface 302). Next, in the step 564, the database 130 may receive feedback on the data portions from the users (e.g., as the signals ANSWER_A-ANSWER_N based on the feedback input 374 from the gamification interface 302). In the step 566, the feedback and update module 316 may update the object detection results based on the feedback. For example, the metadata 158 may be updated and/or the capture devices 100a-100n may receive updated information to improve detection results. Next, the method 550 may move to the step 568. The step 568 may end the method 550.

Generally, when there is a low confidence result, the server 120 may send that data portion 370 of the signal IMG to the gamification app for the user to provide feedback and then updates the detection results using the feedback. Occasionally there may be an audit on objects detected with a high confidence value, which would confirm results and potentially identify 'troll' users providing incorrect answers.

Figure 12:
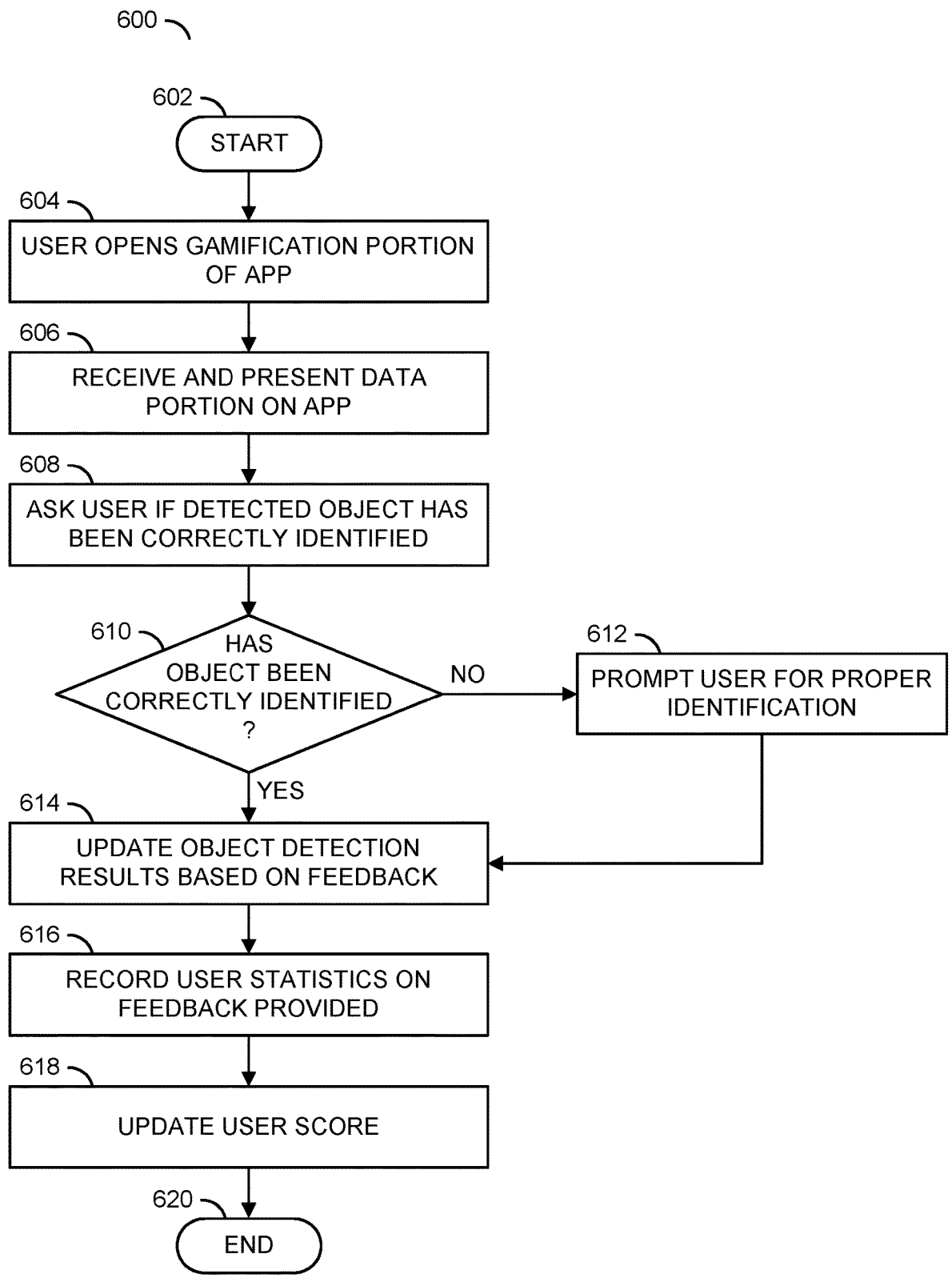
FIG. 12 is a flow diagram illustrating a method for receiving user feedback on object detection.

Referring to FIG. 12, a method (or process) 600 is shown. The method 600 may receive user feedback on object detection. The method 600 generally comprises a step (or state) 602, a step (or state) 604, a step (or state) 606, a step (or state) 608, a decision step (or state) 610, a step (or state) 612, a step (or state) 614, a step (or state) 616, a step (or state) 618, and a step (or state) 620.

The step 602 may start the method 600. In the step 604, the user 352 may open the gamification portion 302 of the companion application 300. Next, in the step 606, the user device 112i may receive the signal GAME_I and present the data portion 370 on the gamification interface 302. In the step 608, the gamification interface 302 may display the instructions 372 to ask the user if the object (e.g., the data portion 370) has been correctly identified. Next, the method 600 may move to the decision step 610.

In the decision step 610, the gamification interface 302 may determine whether the object has been correctly identified. The gamification interface 302 may receive the feedback based on the user input using the feedback buttons 374a-374b (e.g., indicating yes or no). If the object has not been correctly identified, the method 600 may move to the step 612. In the step 612, the gamification interface 302 may prompt the user for proper identification similar to the example scenario 400 shown in association with FIG. 7. Next, the method 600 may move to the step 614. In the decision step 610, if the object has been correctly identified, the method 600 may move to the step 614.

In the step 614, the user device 112i may present the signal ANSWER_I to the database 130 and the update and feedback module 316 may update the object detection results based on the feedback received. Next, in the step 616, the user storage module 318 may record user statistics on the feedback provided. In the step 618, the user storage module 318 may update the user score (e.g., trust level, number of answers provided, time of response, categories responded to, etc.). Next, the method 600 may move to the step 620. The step 620 may end the method 600.

The user 352 may receive one or more images or videos (e.g., the data portion 370) to provide feedback on, similar to the examples shown in association with FIGS. 6-9. In some embodiments, if the identification by the object detection of the circuits 102a-102n is wrong, the user 352 may manually enter the correction using the blank form 374'. The results may be updated based on the feedback and the user statistics may be updated (how many answers provided, how fast they answered, etc.), and then a score for the user may be generated to rank the user 352.

Figure 13:
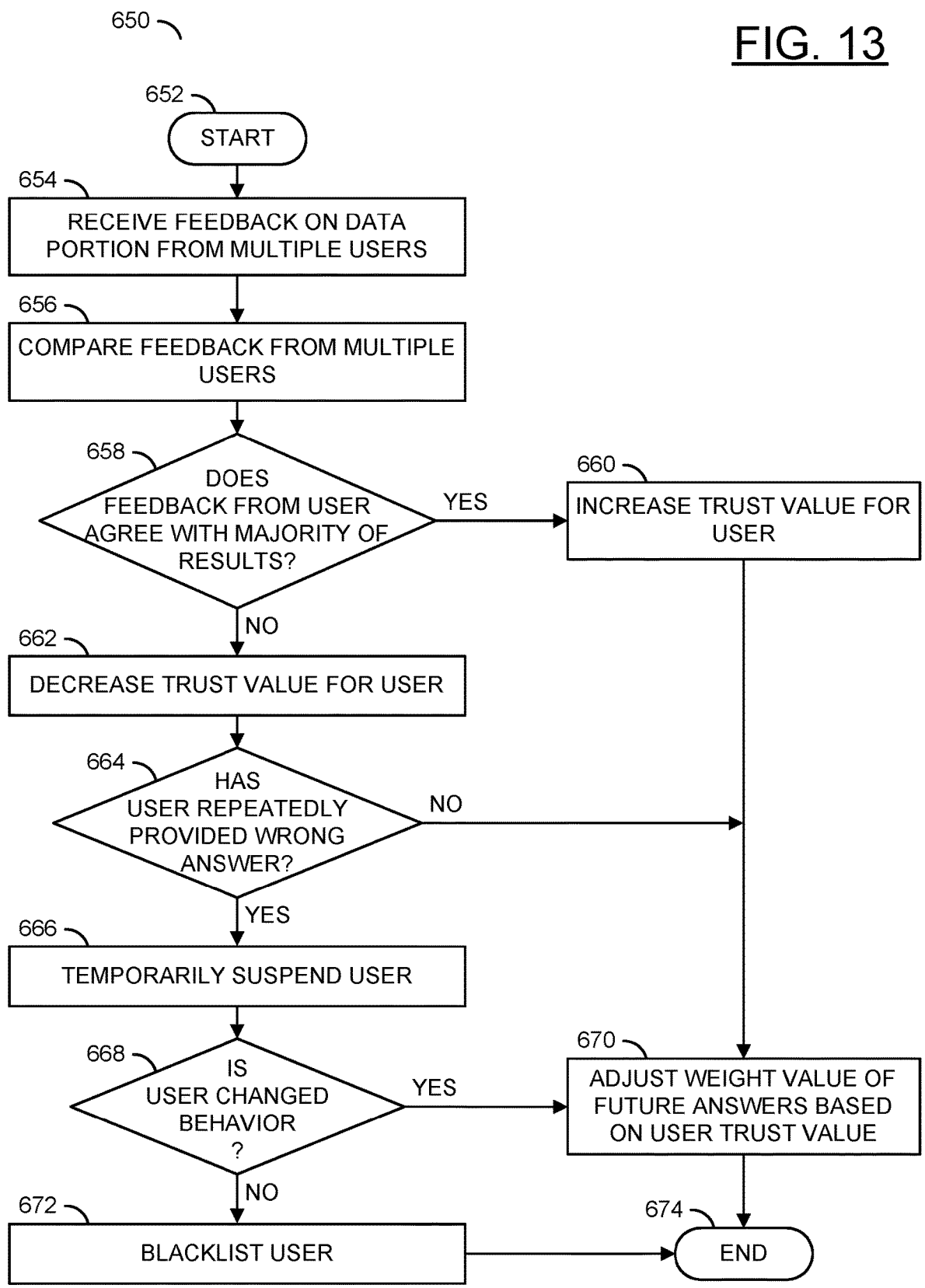
FIG. 13 is a flow diagram illustrating a method for applying a trust value to users based on responses provided.

Referring to FIG. 13, a method (or process) 650 is shown. The method 650 may apply a trust value to users based on responses provided. The method 650 generally comprises a step (or state) 652, a step (or state) 654, a step (or state) 656, a decision step (or state) 658, a step (or state) 660, a step (or state) 662, a decision step (or state) 664, a step (or state) 666, a decision step (or state) 668, a step (or state) 670, a step (or state) 672, and a step (or state) 674.

The step 652 may start the method 650. In the step 654, the database 130 (e.g., the feedback and update module 316 may receive feedback on the data portion 370 from multiple users (e.g., the signals ANSWER_A-ANSWER_N). Next, in the step 656, the feedback and update module 316 may compare the feedback from the multiple users. Next, the method 650 may move to the decision step 658.

In the decision step 568, the feedback and update module 316 and the user storage module 318 may determine whether the feedback from a particular user agrees with the majority of the results. For example, in the example scenario 450 shown in association with FIG. 9, the feedback 452a (e.g., green light) may agree with the majority and the feedback 452d (e.g., red light) may not agree with the majority. In the feedback agrees with the majority of the results, the method 650 may move to the step 660. In the step 660, the user storage module 318 may increase the trust value for the user. Next, the method 650 may move to the step 670.

In the decision step 658, if the feedback does not agree with the majority of results, the method 650 may move to the step 662. In the step 662, the user storage module 318 may decrease the trust value for the user. Next, the method 650 may move to the decision step 664.

In the decision step 664, the user storage module 318 may determine whether the particular user has repeatedly provided wrong answers. For example, the user may be considered to have repeatedly provided wrong answers if the user has reached a particular threshold number of wrong answers (e.g., 10 total), or has answered wrong a particular number of times in a row. If the user has not repeatedly provided wrong answers, the method 650 may move to the step 670.

In the decision step 664, if the user has repeatedly provided wrong answers, the method 650 may move to the step 666. In the step 666, the user storage module 318 may temporarily suspend the user. In an example, the suspension may prevent the user from using the gamification portion 302 for a particular amount of time (e.g., one week). In another example, the suspension may roll back previously earned perks (e.g., penalize the user). In yet another example, the suspension may remove titles that have been awarded. Next, the method 650 may move to the decision step 668.

In the decision step 668, the user storage module 318 may determine whether the behavior of the user has changed after the suspension (e.g., the user has stopped providing incorrect answers, or reduced the frequency of incorrect answers). If the user behavior has changed, the method 650 may move to the step 670. In the step 670 the user storage module 318 may adjust the weight value applied to future answers (e.g., for aggregating feedback) based on the trust value of the user. Next, the method 650 may move to the step 674.

In the decision step 668, if the user behavior has not changed, the method 650 may move to the step 672. In the step 672, the user storage module 318 may blacklist the user. For example, blacklisting the user may permanently ban the user from the gamification portion 302 and/or strip the user of all titles and awards on the leaderboard 482. Next, the method 650 may move to the step 674. The step 674 may end the method 650.

The feedback and update module 316 may weight the answers given from different users. When there is a lot of feedback, the database 130 may check if one user is providing answers similar to what the majority is giving (e.g., which is assumed to be the correct answer). Other checks on whether the user is providing correct answers may be used (e.g., audits using high confidence results). If a user is providing answers consistent with everyone else, then the trust score for the user may increase and as a user becomes more trusted, more weight may be applied to the feedback given from the highly trusted user by the feedback and update module 316. If a user is giving answers that disagree with the majority of the feedback, then the user will have a lower trust score. The trust score may be tracked using the user storage module 318 and/or the user profiles 170a-170n. If a user often gives wrong answers, then the user may be warned and/or suspended temporarily. If the user keeps giving wrong answers, then the user may be banned and/or blacklisted.

A method of cross correlation or cross validation of results may be implemented where the same photos (e.g., the data portions 370) and questions (e.g., the instructions 372) are asked to multiple individuals. Feedback from each of the multiple users may be compared to validate the human input to a certain degree. Each user may have a 'trust score' stored by the user storage module 318 and/or the user profiles 170a-170n. Participants that regularly give answers different from other users, or answers that are invalidated in some other way, may have the 'trust' score reduced in the system. Similarly, users that regularly give answers that are identical to the majority of respondents, or that give answers that are validated in some other fashion, may have the overall trust score increased over time. The trust score may influence the overall confidence level of the results determined by the feedback and update module 316. For example, users with a higher trust score may have more weight applied to the answers submitted and users with a lower trust score may have less weight (or no weight) applied to the answers submitted. The aggregation of the human feedback performed by the feedback and update module 316 may take into account the weights (e.g., trust score) of each user that provided feedback.

In one example, if a license plate that has 0.800 confidence level as returned by the signal OCR_CONF generated by the capture device 100a would be distributed to a number of game participants. The OCR results may be validated as correct by a number of game participants. If these game participants have high trust scores the confidence level of the LPR scan could be increased substantially as there is a greater overall confidence in the original result. If the game participants validate the results but have lower trust scores, the confidence level of the character recognition results may only be increased modestly. If the game participants return mixed results, the combination of trust levels and overall results feedback may be taken into account in the weighting system. Generally, the gamification interface 302 may provide a skip and/or "I don't know" option to allow a user to not risk answering incorrectly and/or incurring penalties by guessing.

Figure 14:
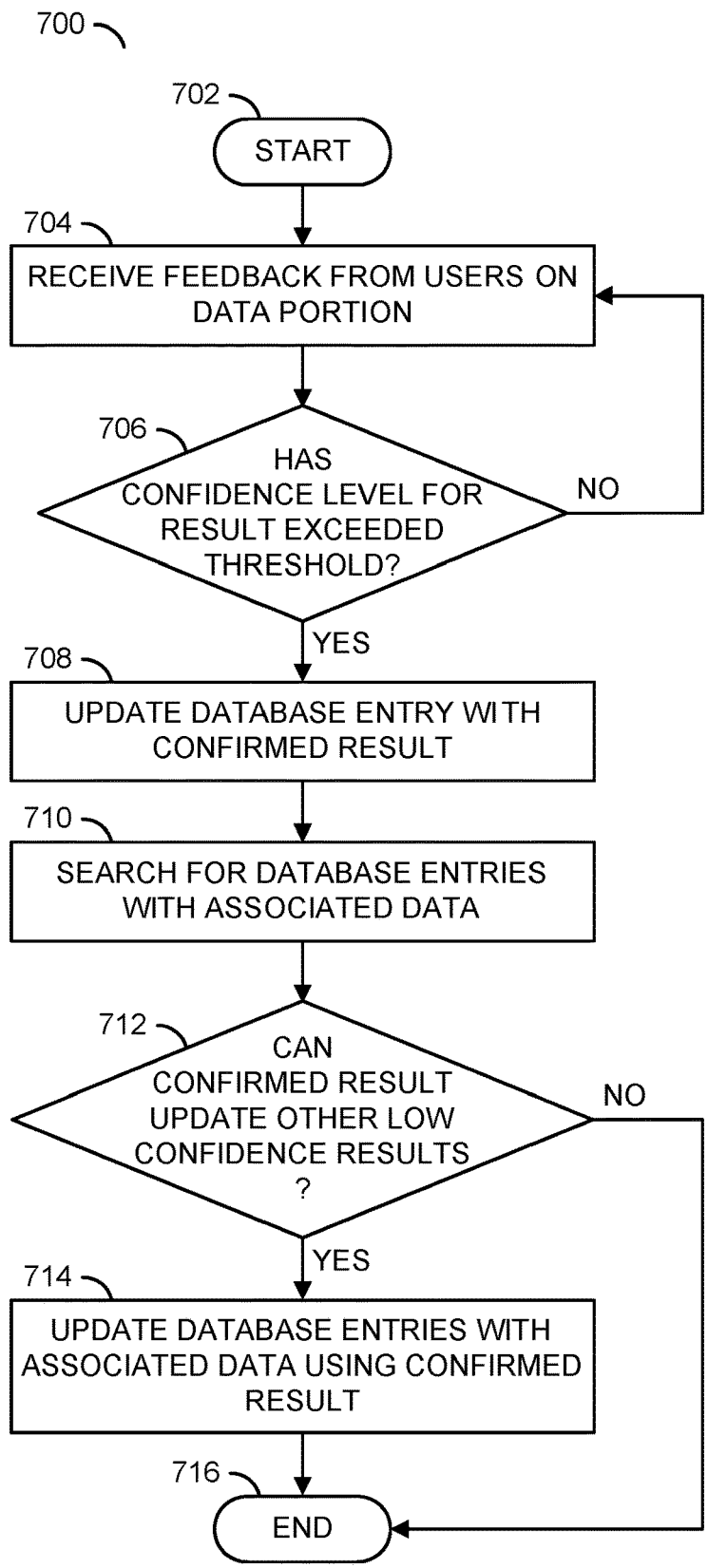
FIG. 14 is a flow diagram illustrating a method for updating database entries in response to feedback provided for associated data.

Referring to FIG. 14, a method (or process) 700 is shown. The method 700 may update database entries in response to feedback provided for associated data. The method 700 generally comprises a step (or state) 702, a step (or state) 704, a decision step (or state) 706, a step (or state) 708, a step (or state) 710, a decision step (or state) 712, a step (or state) 714, and a step (or state) 716.

The step 702 may start the method 700. In the step 704, the database 130 may receive feedback (e.g., the signals ANSWER_A-ANSWER_N) from the users about the data portion 370. Next, the method 700 may move to the decision step 706.

In the decision step 706, the feedback and update module 316 may determine whether the confidence level for the result has exceeded a threshold value. For example, as more users provide feedback, the feedback and update module 316 may aggregate the results (e.g., compare results and/or apply the weighing based on the user trust scores) and the confidence level may increase if the feedback confirms the object detection result. Similarly, the confidence level may decrease until an incorrect result is decided. The threshold may be a pre-selected value (e.g., a value of 0.800, a value of 0.500, a fuzzy logic value such as 'high confidence', etc.). The confidence level module 312 may determine the threshold value of the confidence level. If the confidence level has not exceeded the threshold value, the method 700 may return to the step 704. If the confidence level has exceeded the threshold value, the method 700 may move to the step 708.

In the step 708, the feedback and update module 316 may update the database entry in the metadata 158 (e.g., the object information 186a-186n) with the confirmed result. Next, in the step 710, the database 130 may search the database entries (e.g., each of the objects 184a-184n of each of the video clip metadata 180a-180n) that have associated data (e.g., similar data). Next, the method 700 may move to the decision step 712.

In the decision step 712, the feedback and update module 316 may determine whether the confirmed result can be used to update other low confidence results. In one example, a character on a license plate may be obscured and result in many low confidence results from many different capture devices 100a-100n that were also in the vicinity. When the human feedback confirms the result that was captured by one of the capture devices 100a-100n in the vicinity, the low confidence results from all of the other capture devices 100a-100n may also be updated/corrected. Generally, one result may be used to infer another result if the video data is related (e.g., near a same physical location, captured at a similar time, etc.). If the confirmed result cannot be used to update other low confidence results, the method 700 may move to the step 716. If the confirmed result can be used to update other low confidence results, the method 700 may move to the step 714. In the step 714, the feedback and update module 316 may update the database entries that also corresponds to the confirmed results. Next, the method 700 may move to the step 716. The step 716 may end the method 700.

Generally, once enough feedback is provided to get a confident result, the results may propagate through the database 130 and be used to update previously incorrect results (or low confidence) results that are already stored as the metadata 158 in the database 130. For example, some results may be temporally and/or spatially associated. A high confidence result from a later captured video frame may be used to 'correct' the low confidence result from an earlier captured video frame. A low confidence result captured by one user may be updated using a high confidence result from another user that captured the same object from a different perspective (e.g., a towing hitch may obscure a license plate character from one perspective but the same character may be visible later from a different perspective).

Figure 15:
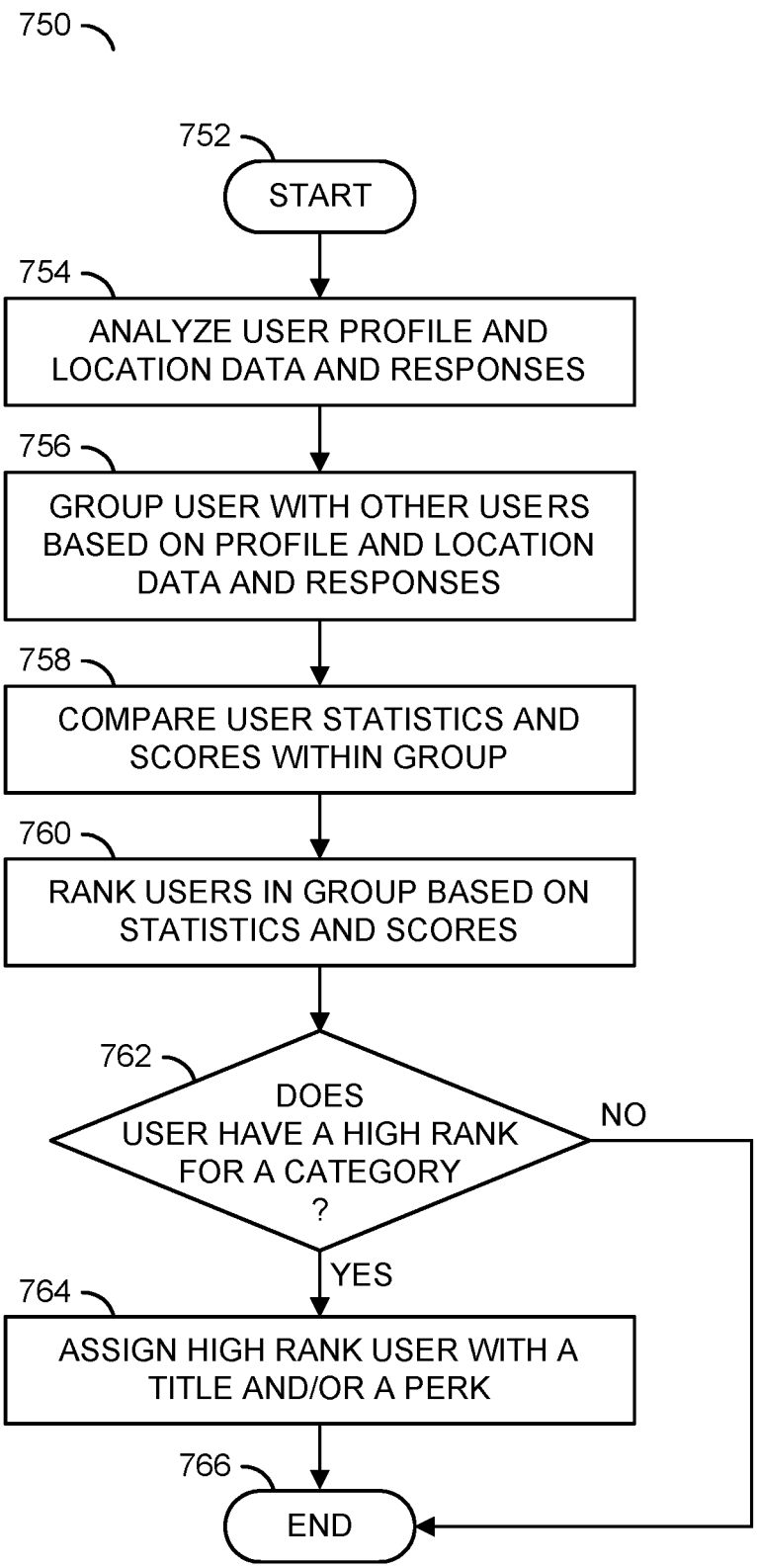
FIG. 15 is a flow diagram illustrating a method for ranking users based on feedback.

Referring to FIG. 15, a method (or process) 750 is shown. The method 750 may rank users based on feedback. The method 750 generally comprises a step (or state) 752, a step (or state) 754, a step (or state) 756, a step (or state) 758, a step (or state) 760, a decision step (or state) 762, a step (or state) 764, and a step (or state) 766.

The step 752 may start the method 750. In the step 754, the user storage module 318 may analyze the profiles, location data and/or responses of the users in the database 130. Next, in the step 756, the user storage module 318 may group a user with other users based on the information in the profile, the location data and/or the responses (e.g., the feedback previously provided). In the step 758, the user storage module 318 may compare user statistics and/or scores within a group. In the step 760, the user storage module 760 may rank the users in the group based on the statistics and/or scores. Next, the method 750 may move to the decision step 762.

In the decision step 762, the user storage module 318 may determine whether the user has a high rank for one of the categories (e.g., the object categories 494a-494n and/or the location categories 496a-496n). If the user does not have a high rank for one of the categories, the method 750 may move to the step 766. If the user does have a high rank for one of the categories, the method 750 may move to the step 764. In the step 764, the user storage module 318 may assign the high ranked user with a title and/or a perk. Next, the method 750 may move to the step 766. The step 766 may end the method 750.

The database 130 may be configured to rank the users based on the scores obtained from using the gamification interface 302. Users may be grouped by region and/or the type of answers provided (e.g., how fast a user responds, the type of objects identified, most correct answers, etc.). The users may be ranked within each group. In one example, the top user may have a title like 'San Francisco Speed King'. For example, at major airports there is often a long queue of ridesharing drivers waiting in a specified area that form a queue. The gamification aspect may encourage the users waiting in the queue at the airport to use the companion application 300 while waiting. For example, the system may add some local intelligence to prompt the users that they are now in the SFO Pick Up Queue and competing against other drivers in the same location (e.g., a sub category competition specific to the location and status of the users).

In some embodiments, when the user 352 initiates the gamification interface 302 a prompt may be generated to ask the user 352 to indicate which categories or titles they will now (optionally) compete for. In one example, a user may be categorized as residing in area code 94122 and may currently be located in the SFO pick up Queue, drives a Toyota Camry, hails originally from Bombay, is a 4 star+ Uber ranking, has delivered 2000-2500 rides, and has driving for 3-4 years with Uber can compete within all or some of these categories.

Figure 16:
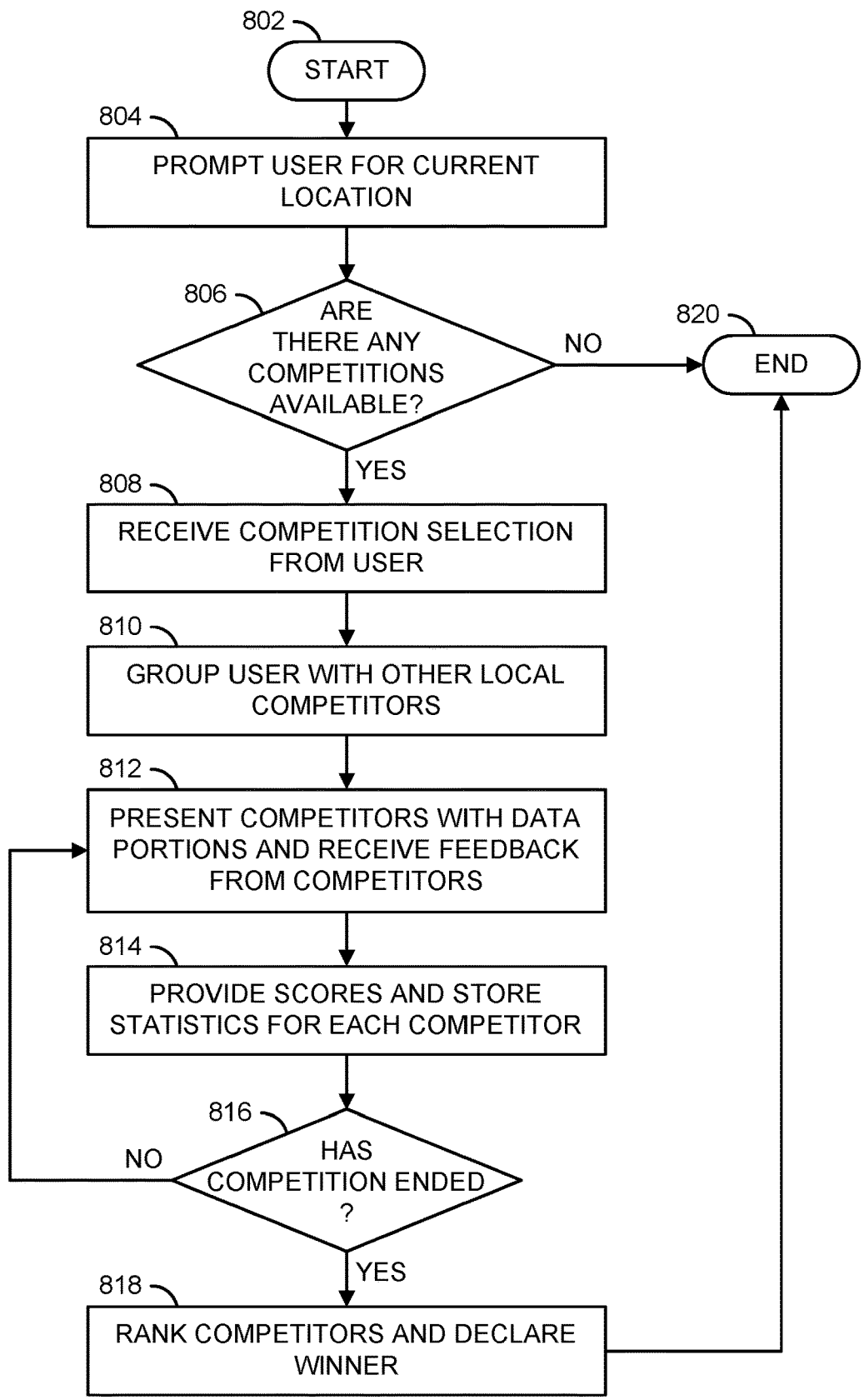
FIG. 16 is a flow diagram illustrating a method for providing a local competition.

Referring to FIG. 16, a method (or process) 800 is shown. The method 800 may provide a local competition. The method 800 generally comprises a step (or state) 802, a step (or state) 804, a decision step (or state) 806, a step (or state) 808, a step (or state) 810, a step (or state) 812, a step (or state) 814, a decision step (or state) 816, a step (or state) 818, and a step (or state) 820.

The step 802 may start the method 800. In the step 804, the gamification interface 302 may generate a prompt to ask the user 352 for a current location. Next, the method 800 may move to the decision step 806.

In the decision step 806, the user storage module 318 may determine whether there are any competitions available. For example, the user device 112i may generate the signal ANSWER_I having the location of the user 352 and the user storage module 318 may determine whether available competitions are suitable for the user 352. If there are no competitions available, the method 800 may move to the step 820. If there are competitions available, the method 800 may move to the step 808.

In the step 808, the database 130 may generate the signal GAME_I, the user device 112i may display the competition selection options, the user 352 may select one of the competitions and the signal ANSWER_I may be received by the database 130. Next, in the step 810, the user storage module 318 may group the user 352 with other local competitors in the selected competition. In the step 812, the database 130 may present the competitors with the data portion 370 and receive feedback from the competitors. Next, in the step 814, the user storage module 318 may provide scores and/or store statistics for each competitors based on the feedback received. Next, the method 800 may move to the decision step 816.

In the step 816, the database 130 may determine whether the competition has ended (e.g., based on a pre-determined length of time, based on a total number of feedback received, based on an amount of feedback from each user, etc.). If the competition has not ended, the method 800 may return to the step 812. If the competition has ended, the method 800 may move to the step 818. In the step 818, the user storage module 318 may rank the competitors and declare a winner of the competition. For example, the winner may be declared on the leaderboard 482. Next, the method 800 may move to the step 820. The step 820 may end the method 800.

The gamification interface 302 may provide the user 352 with a list of available local competitions. The competitions may group a user with other local competitors. The competitions may comprise the metadata server 120 providing each competitor with various data portions 370 (e.g., objects to identify). The data portions 370 may be the same or different for each competitor. Each competitor may provide feedback and the metadata server 120 may store statistics for each competitor. Scores may be generated for each competitor based on the statistics from the competition. Each competitor may be ranked based on the scores. When the competition period ends, the top ranked competitor may be declared the winner. The competition period may be based on a pre-determined time period (e.g., each month) and/or reaching a total score. In some embodiments, the competition may not have a defined end (e.g., an ongoing competition).

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
a database configured to
(i) store metadata generated in response to objects detected in a video generated by a capture device and a data portion of said video associated with said metadata,
(ii) store a confidence level associated with said metadata,
(iii) provide to a plurality of users (a) said data portion of said video and (b) a request for feedback,
(iv) receive said feedback based on the request,
(v) update said confidence level associated with said metadata in response to said feedback, and
(vi) apply a statistical weight to said feedback for each user of said users when updating said confidence level associated with said metadata; and
a user device comprising a processor, said user device configured to
(i) display said data portion of said video, (ii) accept input for said data portion to receive said feedback from one of said plurality of users and (iii) communicate said feedback to said database,
wherein (a) said confidence level indicates a likelihood of correctness of said objects detected in response to video analysis performed on said video by said capture device based on machine learning, (b) said machine learning (i) is configured to enable said capture device to generate object detection results and (ii) enables said object detection results to be improved in response to said feedback, (c) said database tracks user statistics for said plurality of users based on said feedback, (d) said user statistics comprise a trust level for each user of said plurality of users, (e) said trust level is based on whether said feedback previously provided by one of said users is determined to be correct, (f) said user statistics are presented to said user device to provide a competition between said users, (g) said competition provides a gamified experience to encourage said users to provide said feedback about said video analysis performed by said capture device, (h) said feedback updates said confidence level to correct results of said video analysis for said capture device, (i) a rank is provided separately for each category of a plurality of categories to enable said competition separately for each category of said plurality of categories and (j) said rank for each user of said plurality of users is based on said user statistics.

2. The system according to claim 1, wherein said user device is implemented as a smartphone.

3. The system according to claim 1, wherein (i) said user device is implemented as a smart watch and (ii) said smart watch is configured to enable at least one of Wi-Fi and cellular communication.

4. The system according to claim 1, wherein said user device does not display said data portion or receive said feedback when one of said users associated with said user device is driving.

5. The system according to claim 1, wherein (i) said database is configured to generate a query comprising said data portion and said request for said feedback and (ii) said user device is configured to display a gamification interface configured to display said data portion and receive said feedback about said correctness of said objects detected in response to said video analysis.

6. The system according to claim 5, wherein said gamification interface is configured to present said query with a yes response and a no response.

7. The system according to claim 6, wherein (i) said gamification interface presents a blank text field to enable one of said users to enter a correction for said objects detected in response to said video analysis and (ii) said correction is presented to said database as said feedback.

8. The system according to claim 5, wherein (i) said gamification interface is configured to present said query with multiple choice options and (ii) said multiple choice options are generated based on a plurality of confidence levels associated with potential results from said video analysis.

9. The system according to claim 1, wherein said statistical weight for one of said users is associated with said trust level for said one of said users.

10. The system according to claim 1, wherein said database is configured to penalize each user of said plurality of users when said trust level is low.

11. The system according to claim 1, wherein said user statistics comprise a score for each user of said plurality of users.

12. The system according to claim 11, wherein said database is configured to provide a leaderboard configured to display said rank for each user of said plurality of users based on said score.

13. The system according to claim 12, wherein (i) said leaderboard comprises said plurality of categories of said objects detected.

14. The system according to claim 12, wherein said database is configured to provide perks for each user of said plurality of users based on said rank.

15. The system according to claim 1, wherein (i) said feedback from each user of said plurality of users is aggregated by said database and (ii) said aggregated feedback is used for training said video analysis.

16. The system according to claim 1, wherein said objects comprise at least one of a license plate, individual license plate characters, vehicles, street signs, traffic lights, pedestrians or roadway characteristics.

17. The system according to claim 1, wherein (i) said database is configured to correct previously stored metadata based on said update of said confidence level and (ii) said feedback provides a disparate source of data to enable the system to infer results that would be unable to be determined from one source alone.

18. The system according to claim 1, wherein said metadata comprises information extracted by said capture device from said video without said database storing each video frame of said video captured by said capture device.

19. The system according to claim 1, wherein said gamified experience provides an incentive to solicit human input as said feedback.

* * * * *